United States Patent [19]

Urata et al.

[11] Patent Number: 5,455,408
[45] Date of Patent: Oct. 3, 1995

[54] MAGNETIC RECORDING CIRCUIT FOR TOLL ROAD TICKET

[75] Inventors: Hideo Urata; Naoshi Noguchi; Shigeru Jojo, all of Kobe; Riichiro Yamashita, Takasago; Nobuhide Hirako, Kobe, all of Japan

[73] Assignee: Mitsubishi Jukogyo Kabushiki Kaisha, Tokyo, Japan

[21] Appl. No.: 22,282

[22] Filed: Feb. 25, 1993

Related U.S. Application Data

[62] Division of Ser. No. 756,991, Sep. 9, 1991, Pat. No. 5,274,218.

[30] Foreign Application Priority Data

| Sep. 7, 1990 | [JP] | Japan | 2-235745 |
| Sep. 7, 1990 | [JP] | Japan | 2-235746 |
| Feb. 19, 1991 | [JP] | Japan | 3-024653 |

[51] Int. Cl.$^6$ .................................. G11B 25/04
[52] U.S. Cl. .................................. 235/384; 360/2
[58] Field of Search ...................... 235/449, 384, 235/454, 487, 494; 360/2, 30, 40, 54, 45, 67; 375/14, 101

[56] References Cited

U.S. PATENT DOCUMENTS

| 4,024,379 | 5/1977 | Pfost et al. | 235/449 X |
| 4,319,287 | 3/1982 | Swenson | 360/40 |
| 4,523,181 | 6/1985 | Taraki et al. | 340/347 |
| 4,553,131 | 11/1985 | Endoh | 360/40 X |
| 4,571,575 | 2/1986 | McCullough | 360/40 X |
| 4,962,301 | 10/1990 | Rokutan | 235/454 X |
| 5,005,184 | 4/1991 | Amano et al. | 375/14 |
| 5,222,058 | 6/1993 | Oshiba | 235/454 X |

FOREIGN PATENT DOCUMENTS

| 1400561 | 7/1975 | United Kingdom . |
| 1522895 | 8/1978 | United Kingdom . |
| 2157867 | 10/1985 | United Kingdom . |

*Primary Examiner*—Donald Hajec
*Assistant Examiner*—Thien Minh Le
*Attorney, Agent, or Firm*—Jacobson, Price, Holman & Stern

[57] ABSTRACT

A circuit for reading a toll road ticket in which a mark for magnetic recording density discrimination formed on a ticket is detected and a magnetic record demodulating circuit is selected in accordance with the result of detection. The circuit is a digital recording circuit and reproducing circuit for a magnetic card utilizing modified frequency modulation. In a toll receiving system of a toll road, coexistence of tickets adopting different magnetic recording densities or recording systems is made possible.

1 Claim, 23 Drawing Sheets

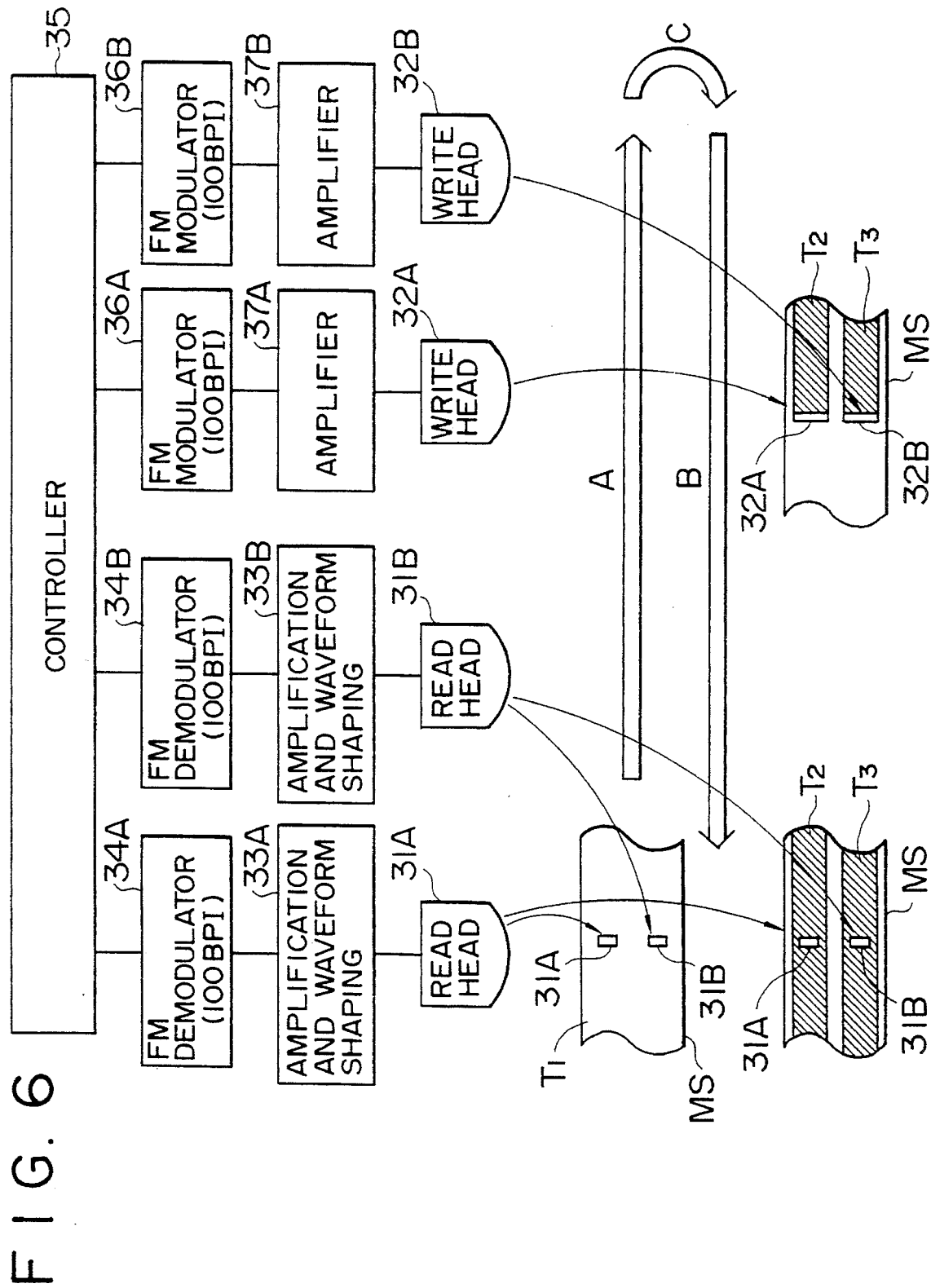
F I G. 6

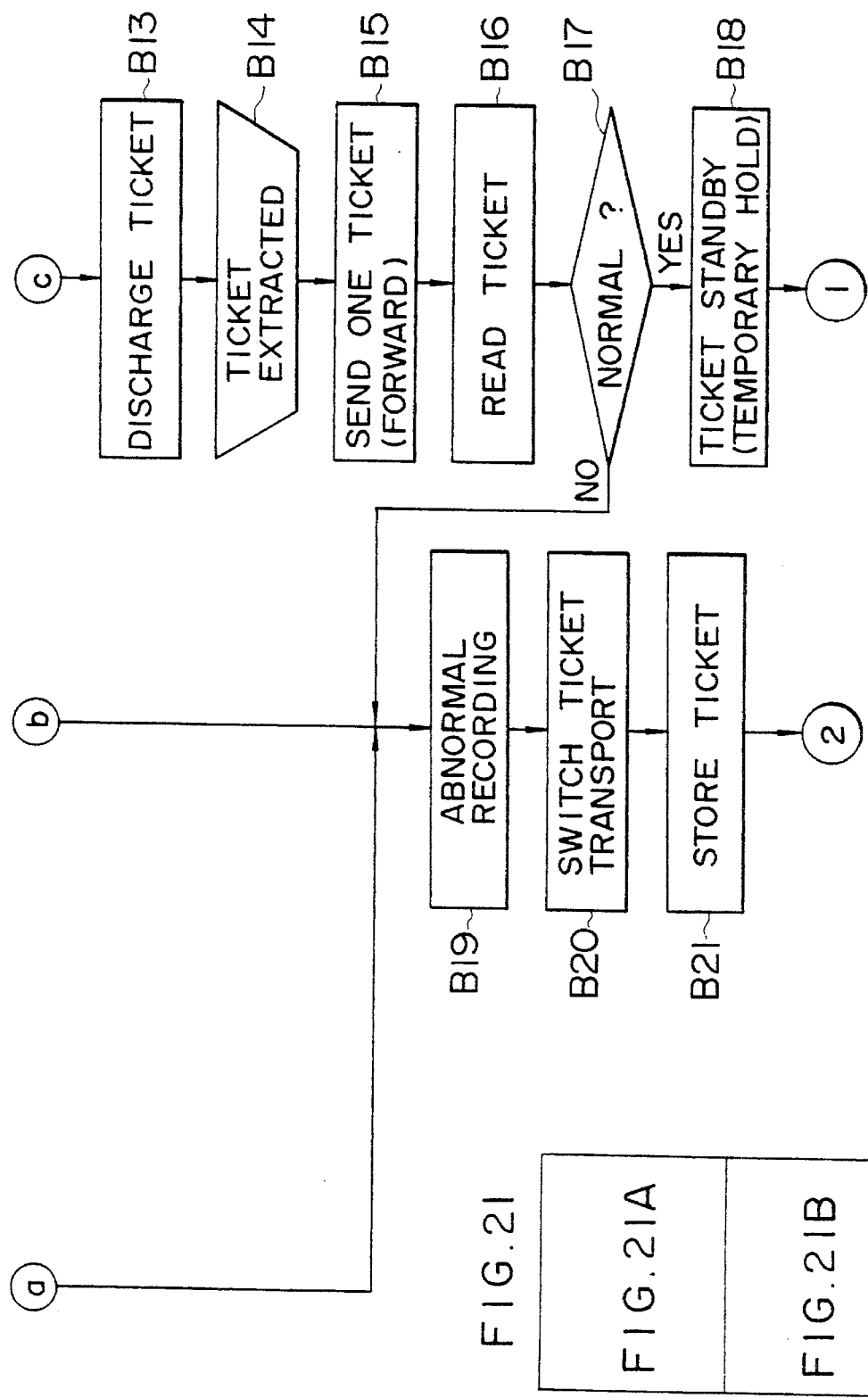

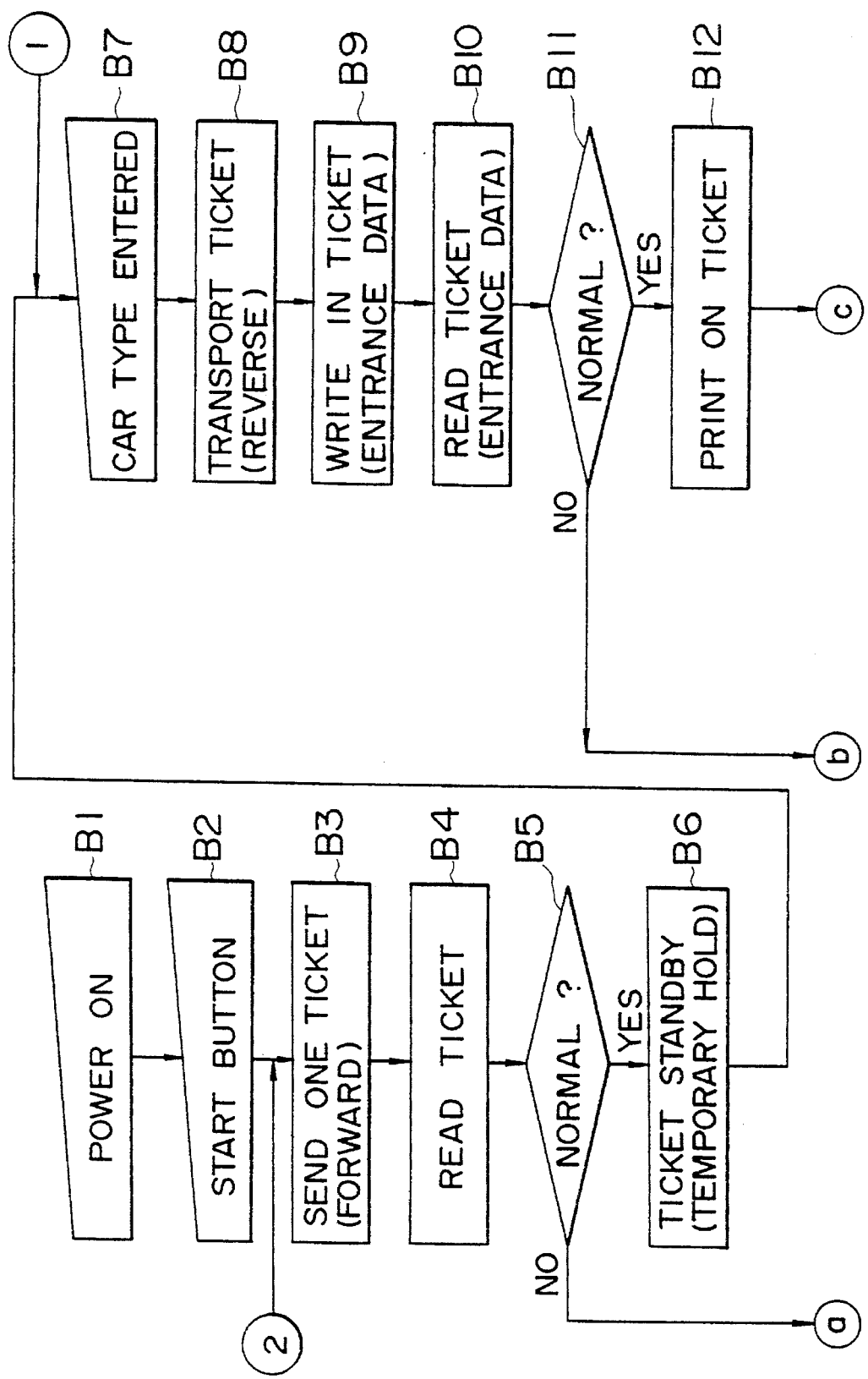

MAGNETIC RECORDING CIRCUIT FOR TOLL ROAD TICKET

This is a divisional of application Ser. No. 07/756,991 filed Sep. 9, 1991, now U.S. Pat. No. 5,274,218.

BACKGROUND OF THE INVENTION

1. Field of the Invention

The present invention relates to a toll receiving system of a toll road, and more particularly to a method which is able to read information correctly even from tickets an which information has been written at different recording density.

The present invention relates further to a magnetic record conversion method which is capable of increasing a magnetic recording capacity of a magnetic card type ticket even when an existing magnetic card type terminal equipment coexists with new equipment.

2. Description of the Related Art

In a long-distance toll road and the like dotted with entrance gates and exit gates at a plurality of locations, a toll is collected which depends on the distance driven and the type of vehicle. Specifically, a ticket in which the entrance gate information such as the type of a car, the date and hour of use or the entrance gate name is recorded magnetically in addition to printing is issued and handed over to a user at the entrance gate of a toll road, and an operator takes the ticket from the user and reads information recorded magnetically in the ticket so as to collect the toll for the use at the exit gate.

For this purpose, terminal equipment for processing tickets or cards such as a "Highway Card" which is a prepaid card and a credit card called a "Separately Paid Plate" are installed at the entrance gates and the exit gates of above-described toll road and the like.

FIG. 9 shows an example of a magnetic card type ticket MC. In FIG. 9, MS denotes a magnetic stripe, where magnetic recording is made with one side track. In an existing terminal equipment, the recording density is at 100 bits per inch (BPI), and the recording system is an FM system. Further, in the terminal equipment at the entrance gate, one track is divided into three areas MS1, MS2 and MS3 in a length direction of the track for backing up recorded contents, so that the same entrance gate information is recorded in each area. Further, in the terminal equipment at the exit gate, after the entrance gate information has been read, the exit gate information such as the toll, the exit gate name and the date and hour is recorded by overwriting in one of those areas in addition to this entrance gate information, and furthermore, the recorded information is read so as to confirm whether recording has been made correctly or not.

Recently, a trend has developed in which the quantity of information recorded at the exit gate, in particular, is increasing has developed due to such reasons that toll collection with a credit card is anticipated in the future. As a result, the storage of capacity with an existing recording system using only one track and having a capacity of 100 BPI will not be able to accommodate storage information in the new system.

Thus, it has become necessary to plan increase an in the recording capacity, but it is not practical to replace the terminal equipment at all the gates of a certain toll road with new equipment each having a larger recording capacity at the same time because the road must be closed even if temporarily. Accordingly, the terminal existing is to be gradually replaced with new equipment. In this case, however, tickets having different recording density with existing magnetic card type terminal equipment (hereinafter referred to as existing equipment) and new equipment will coexist. Accordingly, a method which is able to demodulate magnetically recorded information correctly from tickets of different recording densities is required.

Furthermore, in a conventional magnetic card system, a frequency modulation (FM) system is adopted as a coding system for digital magnetic recording.

FIG. 16 shows an example of a record by an FM system. As illustrated in FIG. 16, an FM system forms an FM code array 402 so as to perform magnetization inversion at boundaries 401A of all the bit cells in a data bit array 400 and at centers 401B of bit cells of respective data bits "1". Thus, since it is possible to obtain synchronization among bits in the unit of bit with a magnetization inversion signal 404A at the bit cell boundary when reading, high self-synchronizing capacity can be achieved. In FIG. 16, a reference numeral 403 denotes a regenerative signal, 404 denotes a detection pulse, 405 denotes a detection clock, 406 denotes a decoder input, 407 denotes decoded data, Tb denotes a bit period, and Tw denotes detection window width.

In the FM system, however, the density ratio (DR) of the maximum bit per inch (BPI) to the maximum flux reversals per inch (FRPI) determined by the characteristics of a magnetic card and a magnetic head is as low as DR= BPI/FRPI=0.5. Hence the FM system is not suitable for high-density magnetic recording.

Further, in a conventional magnetic card system, the width of the detection clock 405 at the read time, viz., the detection window width (Tw) is fixed for every system. Therefore, only a magnetic card having a fixed magnetic recording density can be read.

SUMMARY OF THE INVENTION

It is a first object of the present invention to provide a digital recording circuit which, in a processor of a toll road ticket and the like utilizing a magnetic card, is able to set the density ratio to 1 and to double an information recording capacity of a magnetic card with the same magnetic card and the same magnetic head as with a circuit suing FM coding by adopting a modified frequency modulation (MFM) for coding.

It is a second object of the present invention to provide a digital recording circuit which is capable of recording in either system, FM or MFM, and accommodating a conventional magnetic card system which uses FM coding.

It is a third object of the present invention to provide a digital regenerating circuit which is able to decode data in a magnetic card for either the FM system or the MFM system or for the same coding system with different recording densities.

The difference in magnetic record density of a ticket corresponds to existence of a mark or the difference of the mark. Accordingly, it is possible to demodulate an output signal of the read head correctly despite of coexistence of tickets having different magnetic record densities by using magnetic record demodulation means in accordance with the result of mark detection.

A digital recording circuit for a magnetic card according to the present invention for achieving the above object comprises a coding circuit which enocodes input data by an MFM system and outputs an MFM code array having, at the beginning data bits which are "0" continuously for 4 bits or more, which inverts magnetization at bit cell boundaries to a recording amplifier.

Further, a digital recording circuit for achieving the fourth object described above comprises, when it is assumed that the minimum bit period recorded in a magnetic card is Tb(min), a synchronous clock generating circuit which outputs a fundamental clock having a period Tb(min)/$2^N$ Tb(min) over the Nth power of 2, which period is capable of distinguishing a half period of Tb(min) sufficiently, and generates a synchronizing clock by dividing the frequency of the fundamental clock by the power of 2 in accordance with a command, in which the encoding circuit encodes input data using the synchronizing clock by selecting either the MFM system or the FM system in accordance with a command and outputs to a recording amplifier a code array having at the head thereof data bits which are "0" continuously for 4 bits or more which invert magnetization at bit cell boundaries in either encoding system.

Furthermore, the digital regenerating circuit of a magnetic card according to the present invention for achieving the third object comprises a magnetization inversion detection circuit which detects magnetization inversion of the data read out from a magnetic card, a magnetization inversion period measuring circuit which measures by counting a magnetization inversion period Tb at the head of data from magnetization inversion detection signal using a fundamental clock, a synchronizing clock generating circuit which is reset every time the magnetization inversion is detected and generates a synchronizing clock which inverts its output at every ¼ count on the fundamental clock of the measured value Tb of the magnetization inversion period from that time, a detection clock generating circuit which generates a detection clock having a detection window width of ±Tb/4 on the bit cell center by dividing the frequency of the synchronizing clock doubly, and a decoding circuit for decoding the data read from the magnetic card by the detection clock.

Coding according to the MFM system is designed to form an MFM code array 408 so as to conduct magnetization inversion at the bit cell centers 401B of respective data bits "1" in the data bit array 400 and also at a boundary 401C between data bits "0" in case the data bits "0" are continuous as shown in a recording example in FIG. 17. In FIG. 17, a numeral 403 indicates a regenerative signal, 404 indicates a detection pulse, 405 indicates a detection clock, 406 indicates decoder input, 407 indicates decoded data, Tb indicates a bit period, and Tw indicates a detection window width.

Thus, the magnetization inversion signal is not necessarily obtainable at all the bit cell boundaries in the MFM system as compared with the FM system. Therefore, since the self-synchronizing capacity is low but the recording density ratio is high at 1, the MFM system utilized in a magnetic disk device is stable and high-density recording is achieved.

However, for the use as a magnetic card in which variation in the transport speed of recording media has to be considered, the MFM system is not utilized because the self-synchronizing capacity is low.

When encoding is carried out with the MFM system in the present invention, 4 bits or more at the head of the code array show data bits "0" continuously, and magnetization inversion always occurs at the bit cell boundary in this head portion. Thus, when an MFM code array recorded in a magnetic card is read according to the present invention, magnetization inversion is generated at every bit cell boundary at the head of the data read from the magnetic card. Therefore, the bit period is found by measuring the magnetization inversion period. Accordingly, even if the self-synchronizing capacity of the MFM system itself is low or the transport speed of the magnetic card shows variations, it becomes possible to generate a detection clock having a detection window at the bit cell center based on the measured value, thus resulting in an increase of self-synchronizing capacity.

When the encoding circuit selects the MFM system or the FM system in accordance with a command and performs encoding, it is arranged so as to permit the coexistence of a magnetic card system by the existing FM system and that by an MFM system according to the present invention. In case of encoding with either system, 4 bits and more of continuous data bits "0" are recorded at the head of the magnetic data so as to invert magnetization at the bit cell boundaries. As a result, synchronization is obtainable at the time of reading even though recording has been made with either the MFM system or the FM system.

Further, by using a fundamental clock which is of sufficiently higher speed than the minimum bit period in encoding and by dividing the frequency of the fundamental clock in accordance with a command so as to produce a synchronizing clock for encoding, it is possible to record at different recording densities even with the same encoding system. In this case, synchronization is also obtainable irrespective of the period of the synchronizing clock at the time of decoding by recording 4 bits or more of continuous bits "0" at the head of the megnetic data so as to invert magnetization at the bit cell boundaries.

By having recorded 4 bits or more of continuous data bits "0" which invert magnetization at the bit cell boundaries as preamble codes at the head of the magnetic data as described above, when the magnetic inversion period Tb at the head of the magnetic data is measured with a fundamental clock which is sufficiently high in speed (for example, a period of Tb/32) as compared with Tb at the read time as described above, the measured value Tb coincides with the bit width of the relevant magnetic data. Accordingly, as this measured value Tb is held, a synchronizing clock having a ¼ period of Tb is generated synchronously with magnetization inversion detection, and a detection clock is generated from the synchronizing clock, so as to obtain synchronization again at bit cell boundaries or the bit cell centers. Namely, synchronization may be obtained correctly without accumulating variations in the transport speed of the magnetic card.

Accordingly, it is possible to decode data of the magnetic card regardless of whether the MFM system or the FM system is used and even if magnetization inversion periods are different so long as the capacity of the magnetization inversion period measuring circuit is set so that no overflow of the count is produced even at the maximum magnetization inversion period handled in the system, and it is also set so as to count using a fundamental clock which may distinguish sufficiently even the minimum magnetization inversion period.

BRIEF DESCRIPTION OF THE DRAWINGS

FIG. 5 to FIG. 8 show a magnetic record conversion method of the present invention.

FIG. 18 to FIG. 20, FIG. 22 and FIG. 23 are for explaining a ticket identifying machine which is a terminal equipment of a toll receiving system in a toll road, in which:

FIG. 18 is a plan view representing a mechanism conception of a ticket processing portion;

FIG. 19 is a sectional view taken along an arrow mark XIX—XIX in FIG. 18;

FIG. 20 is a flow chart showing processing procedures thereof;

FIG. 21 is a flow chart showing processing procedures in case of application as a ticket vending machine;

FIG. 22 is a perspective view showing the appearance; and

FIG. 23 is a conceptual view showing a schematic structure of a card processing portion.

DETAILED DESCRIPTION OF THE PREFERRED EMBODIMENTS

Embodiments of the present invention will be described with reference to FIG. 1 to FIG. 23.

Figure 1:
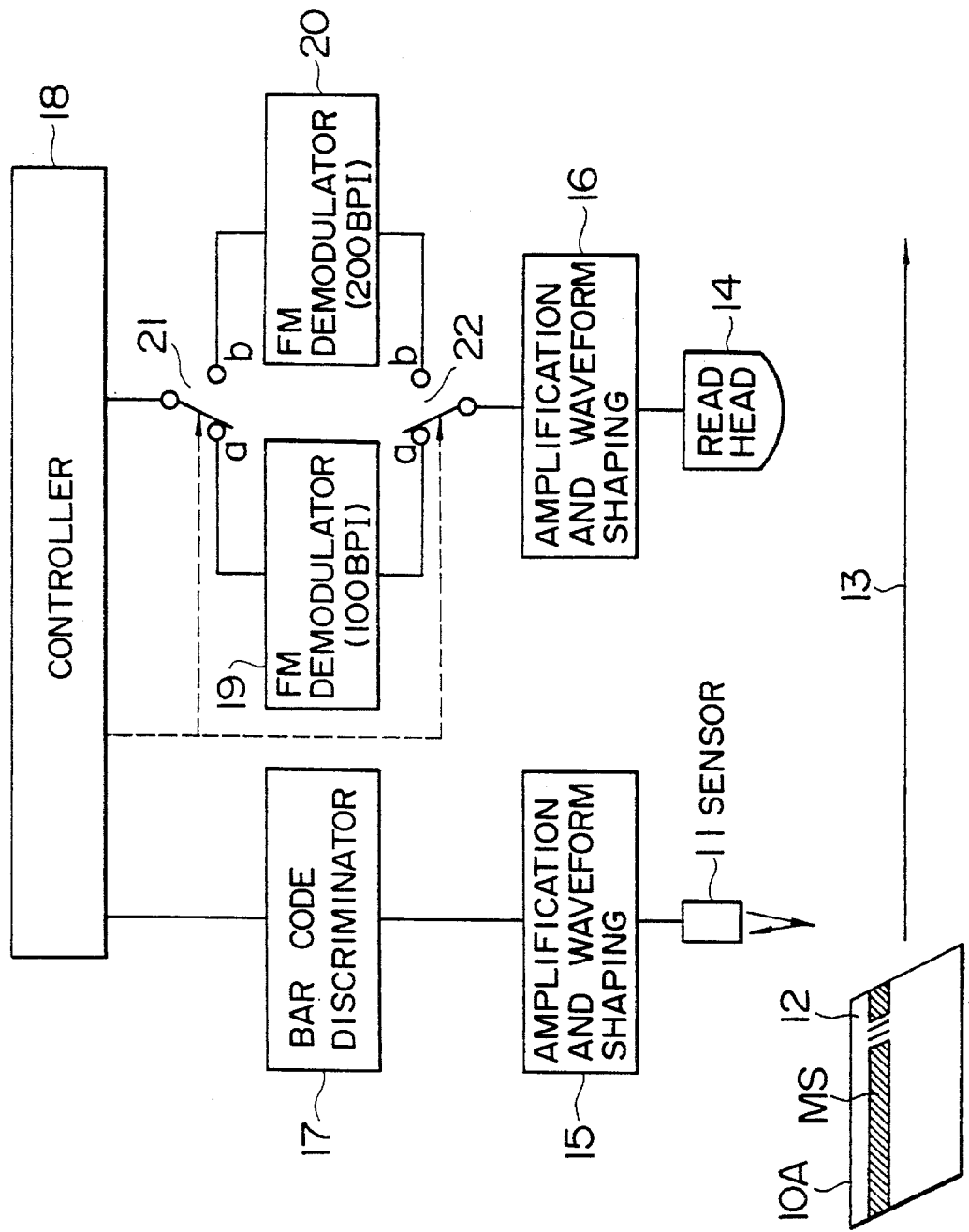
FIG. 1 to FIG. 4 show an embodiment of a magnetic information read method of the present invention.
Figure 9:
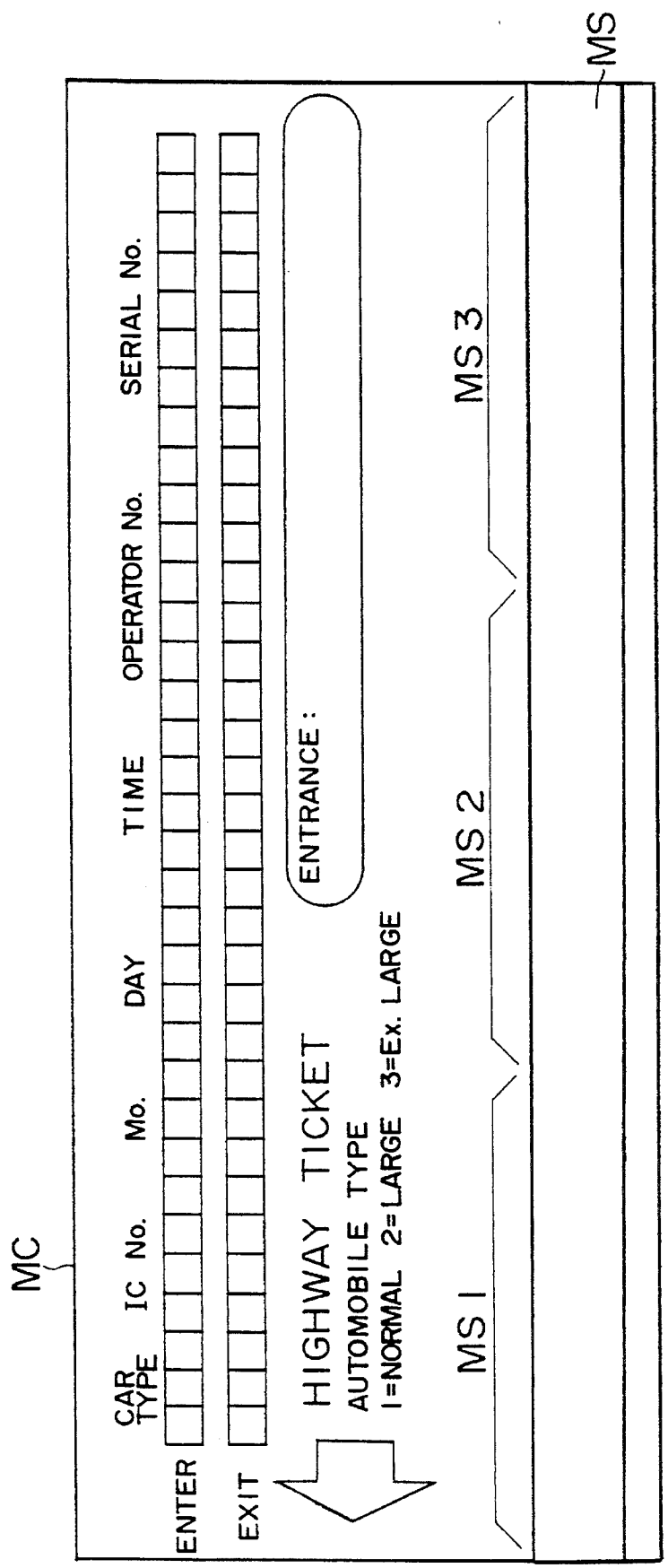
FIG. 9 is a plan view showing an example of the ticket.

FIG. 1 shows a principal part of a terminal equipment in which a mark is detected by a bar code sensor 11 as a first embodiment of the present invention. In FIG. 1, 10A indicates a new type ticket in which information is recorded with an FM system by means of a new equipment at a magnetic recording density as high as 200 BPI, and a bar code 12 is formed as a mark at a tip portion of a card. As compared with the new ticket 10A an existing ticket MC of 100 BPI has no bar code as shown in FIG. 9. Accordingly, it is possible to distinguish between a new type ticket 10A of 200 BPI and an existing ticket MC of 100 BPI depending on the existence of the bar code 12. The bar code 12 may be either of an optical type or of a magnetic type. The same is applied to the bar code sensor 11.

In FIG. 1, there are provided the bar code sensor 11 and a read head 14 along a transport passage 13 for a ticket in the terminal equipment, but the sensor 11 is located at a preceding position. Furthermore, in the terminal equipment there are provided two sets of amplification and waveform shaping circuits 15 and 16, a bar code discriminator 17, a controller 18, an FM demodulator 19 for 100 BPI, an FM demodulator 20 for 200 BPI, and two sets of change-over switches 21 and 22. A transport mechanism and the like will be described later with reference to FIG. 18 to FIG. 23.

The bar code discriminator 17 receives an output signal of the bar code sensor 11 through the amplification and waveform shaping circuit 15, detects the existence of the bar code 12 and gives the result thereof to the controller 18. In case there is no bar code 12, the controller 18 connects the change-over switches 21 and 22 with contacts a on one side, respectively, to select the FM demodulator 19. This FM demodulator 19 receives an output signal of the read head 14 through the amplification and waveform shaping circuit 16 and demodulates the signal, and gives the information recorded magnetically in the existing ticket MC to the controller 18. On the contrary, when a bar code 12 is detected, the controller 18 connects the change-over switches 21 and 22 with contacts b on other sides, respectively, thereby to select the FM demodulator 20 of 200 BPI. Thus, the FM demodulator 20 receives the output signal of the read head 14 this time through the amplification and waveform shaping portion 16 and demodulates the signal, and gives information recorded magnetically in the new type ticket 10A to the controller 18. The controller 18 performs a predetermined processing based on the information of the ticket obtained from the FM demodulator 19 or 20, and records thereafter the processed information in a magnetic stripe MS of the ticket at a high magnetic recording density such as 200 BPI by means of a write head not shown. The controller confirms whether the information has been written correctly or not by reading it immediately thereafter. The ticket is transported here so as to reciprocate in the terminal equipment. New information is written in a return trip, and the read head 14 is used for confirmation immediately thereafter. Furthermore, the change-over switches 21 and 22 are thrown on the contact b side so as to select the FM demodulator 20 of 200 BPI.

Figure 2:
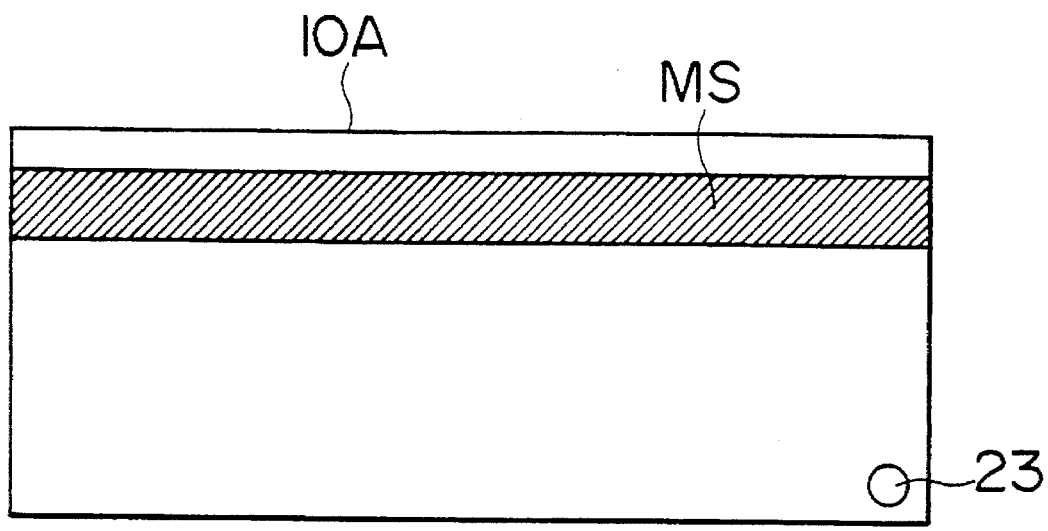
Figure 3:
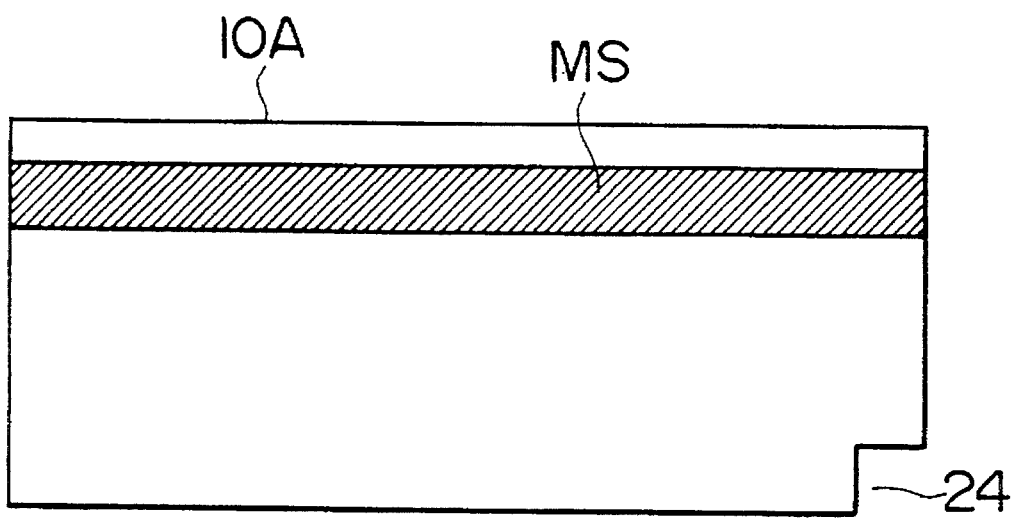

FIG. 2 shows another example of the mark as a second embodiment, in which a hole 23 is formed in the new type ticket 10A of 200 BPI. Further, FIG. 3 shows still another example of the mark as a third embodiment, in which a cutout 24 is formed in the new type ticket 10A of 200 BPI. In contrast to the above, there is neither a hole nor a cutout in an existing ticket MC of 100 BPI shown in FIG. 9. Accordingly, it is possible to distinguish between the new type ticket 10A of 200 BPI and the existing ticket MC of 100 BPI depending on the existence of the hole 23 or the cutout 24. When the hole 23 or the cutout 24 is used as a mark for discriminating magnetic record density, the existence of the hole 23 or the cutout 24 may be detected by using a well-known sensor such as of an optical type in place of the bar code sensor 11 and the bar code discriminator 17 so as to give the result of detection to the controller 18.

Figure 4:
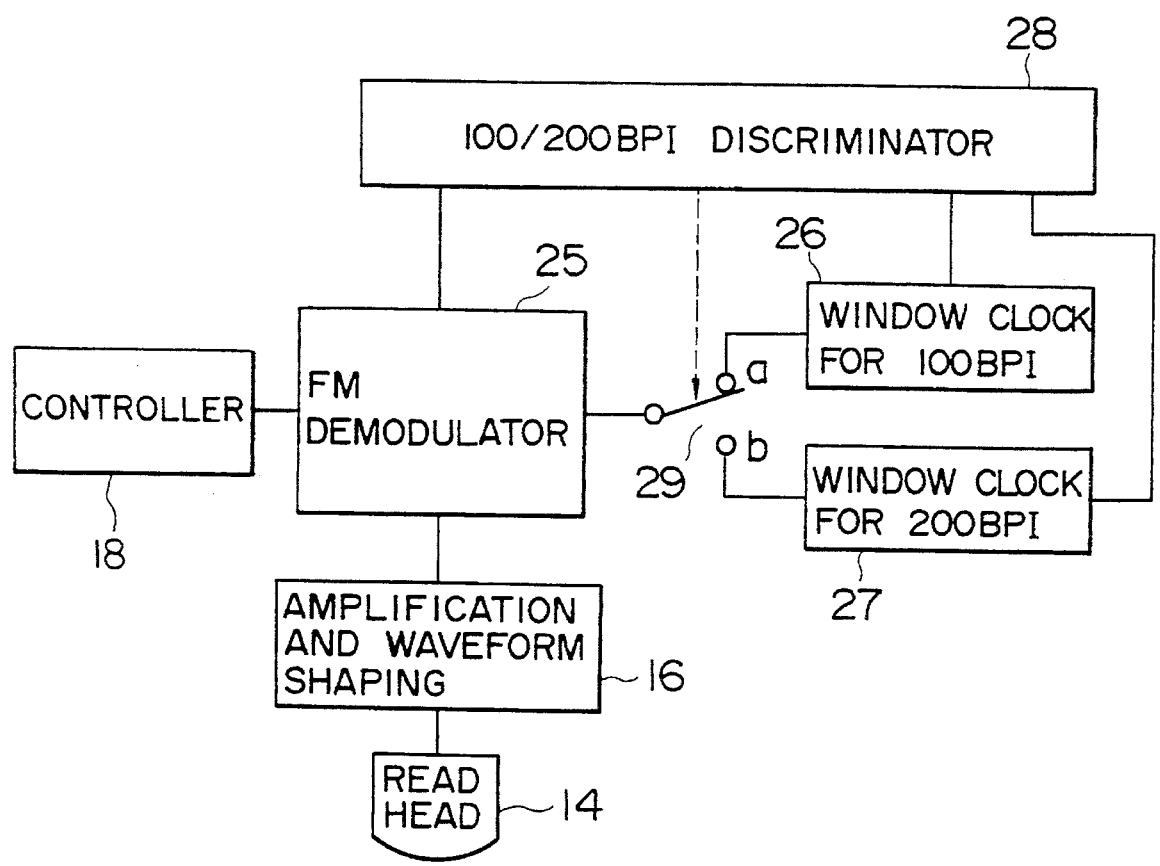

FIG. 4 shows a principal part of a terminal equipment in which the read head 14 itself is used for mark detection as a fourth embodiment of the present invention. In the case of this embodiment, there is no difference in appearance (bar code 12, hole 23, cutout 24 and the like) between a new type ticket and an existing ticket. Therefore, perceiving that "OF" (0, 0, 0, 0, 1, 1, 1, 1) is always recorded at the head of information as a magnetic record format of a toll road ticket, this "OF" portion is utilized as a mark.

In other words, when the "OF" portion of the existing ticket recorded in 100 BPI is demodulated in 100 BPI, the first two bits appear naturally to be (0,0), but when the "OF" portion of the new type ticket recorded in 200 BPI is demodulated in 100 BPI, the first two bits appear to be (1,1), thus making it possible to discriminate between types ticket.

In FIG. 4, there are provided in the terminal equipment an FM demodulator 25, a window clock generator 26 for 100 BPI and a window clock generator 27 for 200 BPI, a discriminator 28 and a change-over switch 29 in addition to the read head 14, the amplification and waveform shaping portion 16 and the controller 18. The change-over switch 29 is controlled by the discriminator 28, but is usually connected with one contact a side and gives a window clock for 100 BPI to the FM demodulator 25. Thus, the FM demodulator 25 usually receives the output signal of the read head 14 through the amplification and waveform shaping portion 16 and conducts FM demodulation in 100 BPI. Then, when the ticket arrives, the discriminator 28 discriminates from the demodulated output of the FM demodulator 25 to find whether the first two bits of the "OF" portion are (0,0) or (1,1). In case of (0,0), the discriminator 28 determines to be an existing ticket of 100 BPI and leaves the change-over switch 29 as it is, and has the FM demodulator 25 operate in 100 BPI. Conversely, if the first two bits of the "OF" portion are (1,1), the discriminator 28 determines to be a new type ticket of 200 BPI, and connects the change-over switch 29 with another contact b side so as to give a window clock for 200 BPI to the FM demodulator 25, and has the FM demodulator 25 operate in 200 BPI.

The controller 18 receives the demodulated output of the FM demodulator 25 so as to take in magnetic record information of the ticket in either case of an existing ticket and a new type ticket. The controller 18 performs a predetermined processing based on this information, and records the processed information in the magnetic stripe MS of the ticket at a high magnetic recording density such as 200 BPI with a write head not shown. Furthermore, the controller 18 confirms whether the information has been written correctly or not by reading immediately thereafter. The ticket is also to be transported so as to reciprocate in the terminal equipment in this case, and new information is written in a return trip. The read head 14 is used for confirmation immediately thereafter, and the change-over switch 29 is switched to the contact b side so as to have the FM demodulator 25 operate in 200 BPI.

The above-described terminal equipment is usable both for an exit gate and an entrance gate.

According to a magnetic information read method of the present invention, it is possible to perform correct demodulation in accordance with the magnetic recording density by detecting a mark by means of an existing terminal equipment and a new type terminal equipment even if tickets having different magnetic recording densities coexist.

Figure 5:
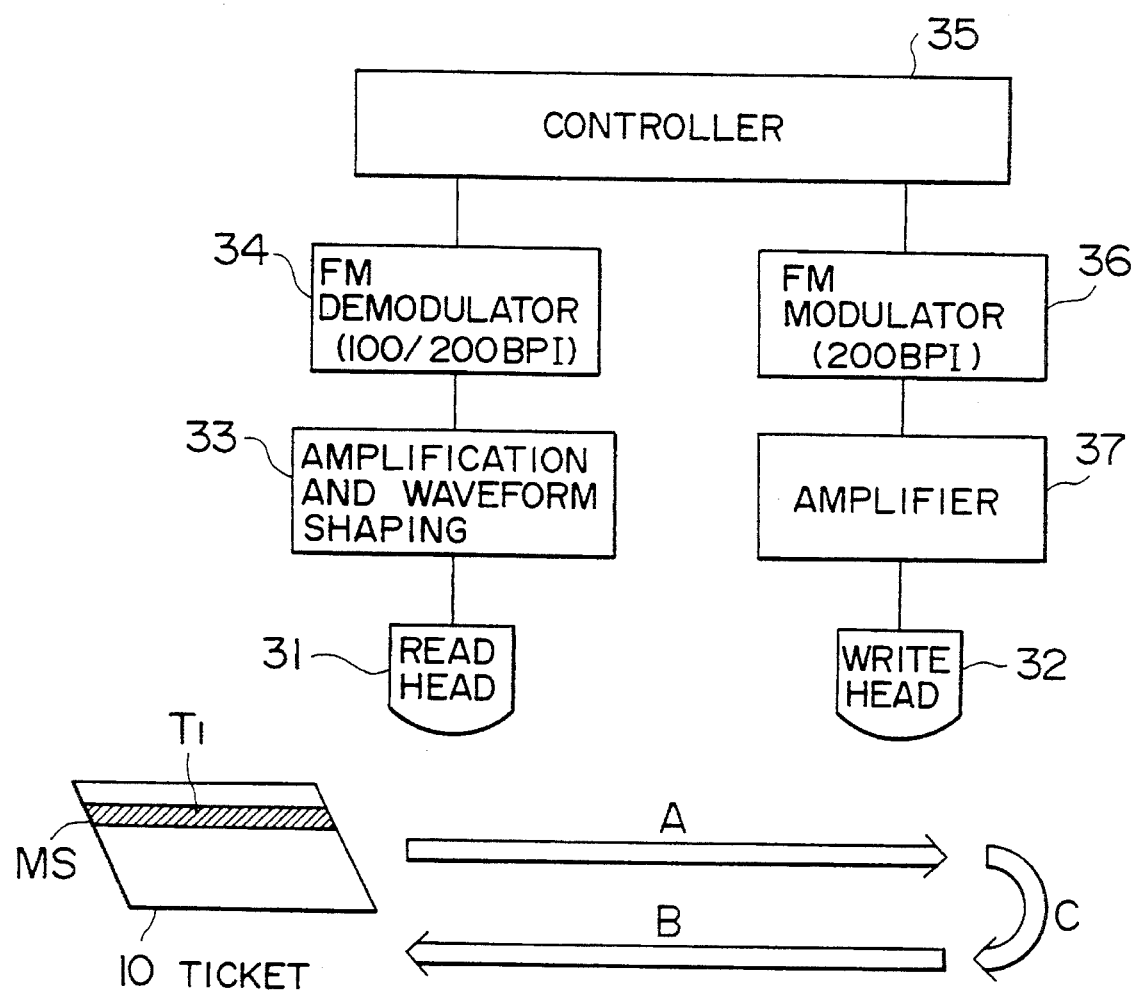

FIG. 5 shows a principal part of a terminal equipment in which one wide track T1 is formed in the magnetic stripe MS of the ticket 10 similar to an existing equipment. There are provided in this terminal equipment one track's worth of a read head 31 and a write head 32, and further an amplification and waveform shaping circuit 33, an FM demodulator 34, a controller 35, an FM modulator 36 and an amplifier 37 for recording. The ticket 10 is transported so as to reciprocate in the terminal equipment. A indicates an inward trip, B indicates a return trip, and C indicates a temporary stop. In the inward trip, the already recorded information of 100 BPI is read from the magnetic stripe MS with the read head 31, and new information is written in 200 BPI by means of write head 32 in the return trip, then recorded contents are confirmed by reading information of 200 BPI with the read head 31. A transport mechanism and the like will be described later with reference to FIG. 18 to FIG. 23.

In FIG. 5, the FM demodulator 34 is able to demodulate both 100 BPI and 200 BPI by a command from the controller 35. When the ticket 10 is transported in the inward trip A, the FM demodulator 34 receives an output signal of 100 BPI of the read head 31 through the amplification and waveform shaping portion 33 and demodulates the output signal with 100 BPI, thereby to give entrance gate information of 100 BPI which has been recorded already in the ticket 10 by the existing equipment to the controller 35. The controller 35 generates exit gate information based on entrance gate information, and gives exit gate information to the write head 32 through the FM modulator 36 and the amplifier 37 so as to carry out recording when the ticket 10 is transported in the return trip B. This FM modulator 36 is of 200 BPI, thus obtaining a recording capacity twice as large as that of the existing equipment. Further, when the ticket 10 is being transported in the return trip B, the controller 35 has the FM demodulator 34 operate in 200 BPI, receives an output signal of 200 BPI on the read head 31 after demodulation, and confirms whether the exit gate information has been recorded correctly or not. Incidentally, recording of the exit gate information may be made by overwriting using any of three areas in the .same manner as before or overwriting on the whole of one track. Further, it may be applied to recording not only at an exit gate, but also at an entrance gate.

FIG. 6 shows a principal part of a terminal equipment, in which, being different from an existing equipment, two lines of tracks T2 and T3 are formed in the magnetic stripe MS of the ticket 10 as a sixth embodiment. In this terminal equipment, there are arranged two read heads 31A and 31B and two write heads 32A and 32B side by side at a right angle to the travel direction within the width of the magnetic stripe MS. Further, respective read heads 31A and 31B are connected with input terminals of the controller 35 through amplification and waveform shaping portions 33A and 33B and FM demodulators 34A and 34B, and respective output terminals of the controller 35 are connected with write heads 32A and 32B through FM modulators 36A and 36B and amplifiers 37A and 37B. Here, all of the FM demodulators 34A and 34B and the FM modulators 36A and 36B are of 100 BPI similar to the existing equipment.

In operation, when the ticket 10 is being transported in the inward trip A, the controller 35 takes in information at an entrance gate or the like in 100 BPI which has already been recorded in one wide track T1 by an existing equipment by using an output of either the FM demodulator 34A or 34B. Then, the controller 35 generates information at an exit gate or the like while splitting it for two tracks, gives it to FM modulators 36A and 36B at the same time when the ticket 10 is being transported in the return trip B, and has the information recorded in respective tracks T2 and T3 in 100 BPI, respectively, by means of two write heads 32A and 32B. With this, the bit density is same as an existing equipment, but the recording capacity is doubled since there are two lines of tracks. Besides, the controller 35 receives information of 100 BPI from two FM demodulators 34A and 34B after writing, respectively, and confirms whether new information at an exit gate and the like has been recorded correctly or not in the respective tracks.

Figure 7:
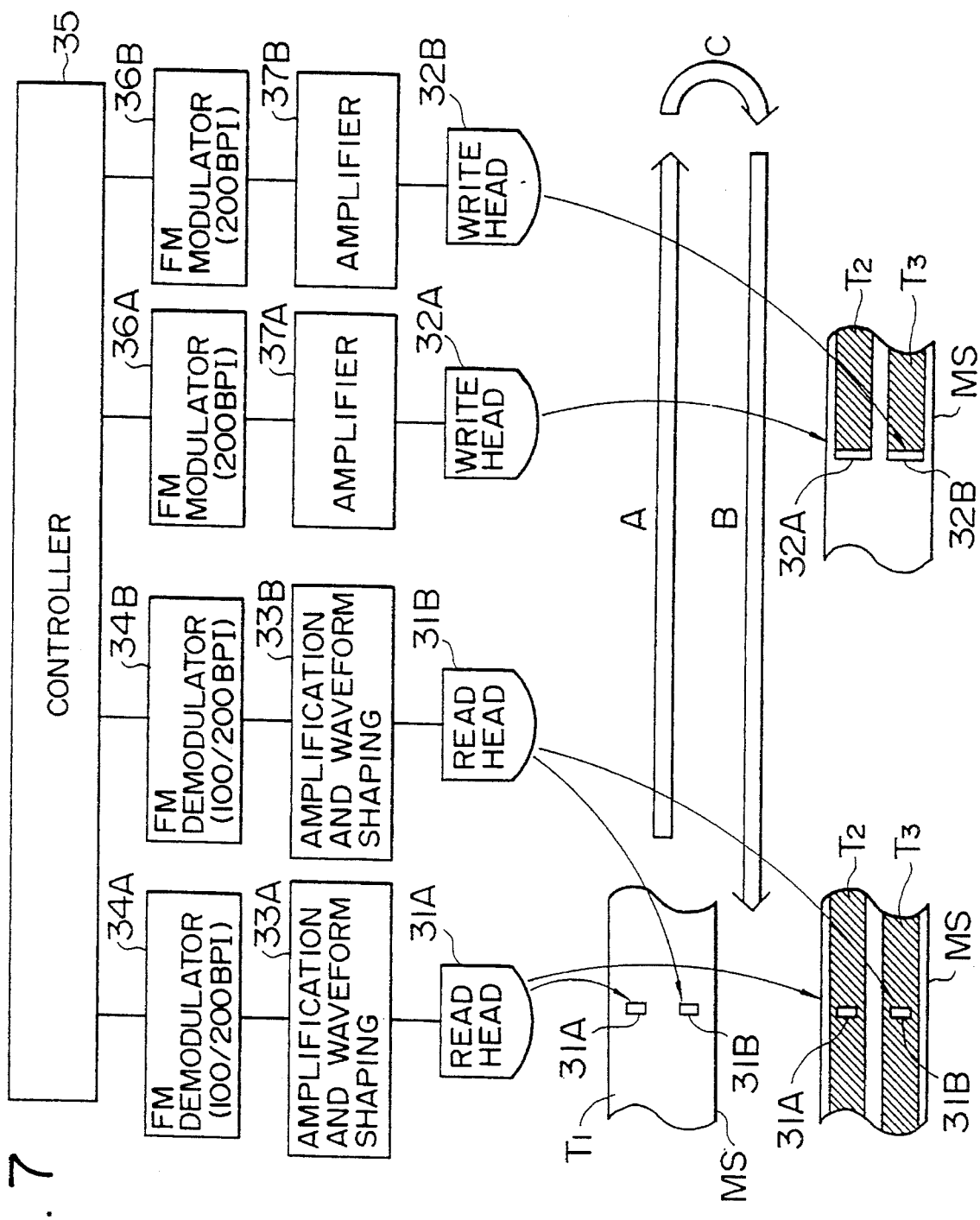

FIG. 7 shows a seventh embodiment. This is a modification of the sixth embodiment shown in FIG. 6, in which two FM demodulators 34A and 34B are able to demodulate both 100 BPI and 200 BPI by a command from the controller 35, and two FM modulators 36A and 36B perform FM modulation of 200 BPI. The arrangement of respective two read heads 31A and 31B and write heads 32A and 32B is the same as that in the sixth embodiment, and two lines of tracks T2 and T3 are formed in the magnetic stripe MS. With this, the recording capacity becomes four times as large as that of an existing equipment. In operation, the controller 35 takes the entrance gate information of 100 BPI which has been already recorded by the existing equipment into one wide track T1 by 100 BPI demodulation operation of either FM demodulator 34A or 34B while the ticket 10 is being transported in the onward trip A. Then, the exit gate information is generated and divided into two track portions, and is given to two FM modulators 36A and 36B when the ticket 10 is being transported in the return trip B, thus recording in respective tracks T2 and T3 in 200 BPI, respectively, by means of two write heads 32A and 32B. After writing, the controller 35 receives information of respective tracks by 200 BPI demodulation operation of two FM demodulators 34A and 34B and judges whether recording has been made correctly or not.

Figure 8:
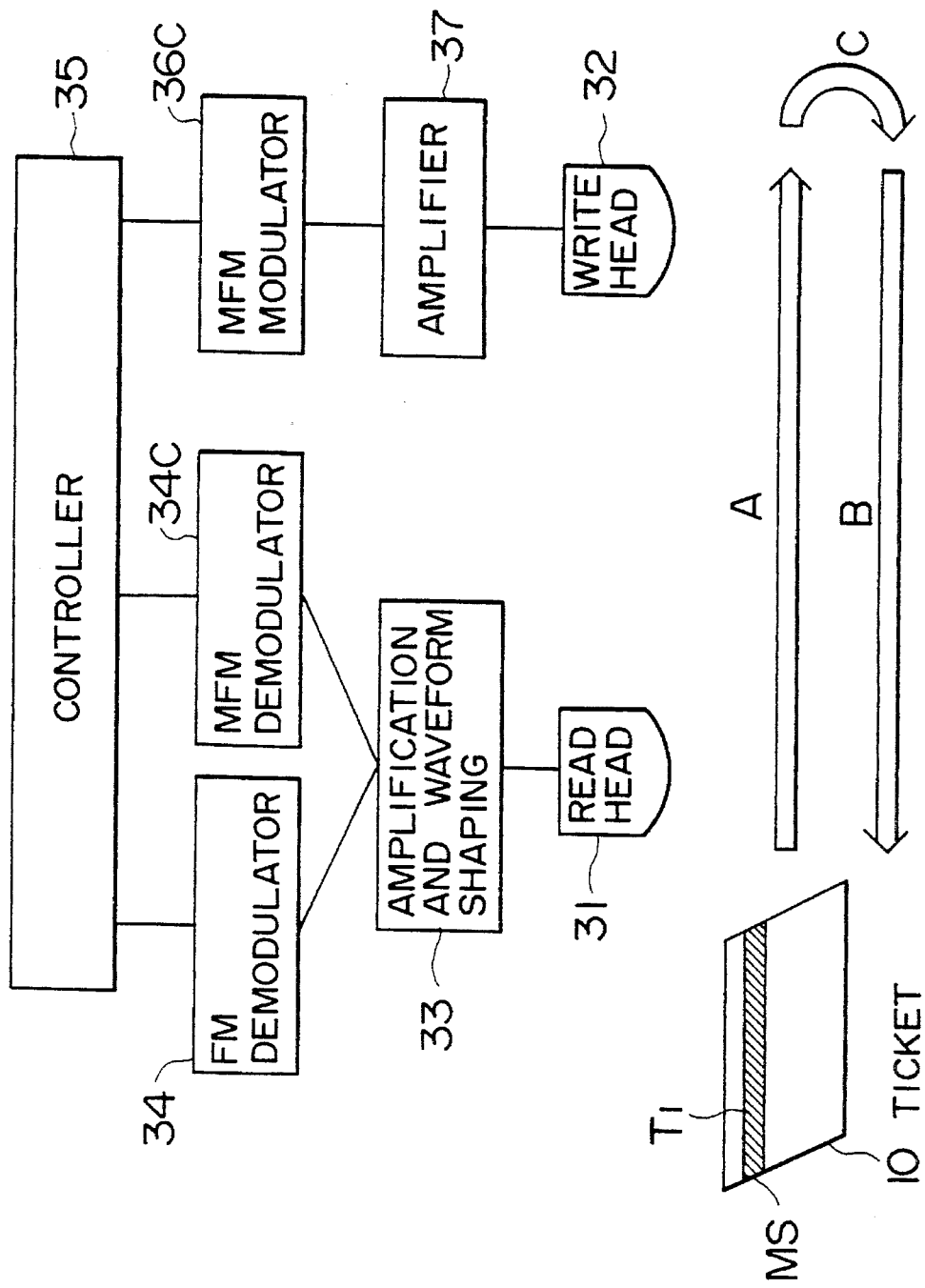

FIG. 8 shows a principal part of a terminal equipment using an MFM system as an eighth embodiment. However, there is one line of wide track, and the read head 31 and the write head 32 are the same as existing equipments of 100 BPI. Further, there are provided an MFM demodulator 34C of 200 BPI and an MFM modulator 36C of 200 BPI in addition to the existing demodulator 34 of 100 BPI.

In operation, the controller 35 takes in the entrance gate information of 100 BPI which has already been recorded in one wide track T1 by the existing equipment through a read head 31, an amplification and waveform shaping portion 33 and an FM demodulator 34 of 100 BPI when the ticket 10 is being transported in the inward trip A. Then, exit gate information is generated and is given to the MFM modulator 36C when the ticket 10 is transported in the return trip B, and recording in 200 BPI is made by means of the write head 32. In this case, even if the bit density is 200 BPI, the flux variation density is 200 FCPI due to the MFM system, which is the same as the case of 100 BPI by the FM system of the existing equipment. After writing, the controller 35 receives information of 200 BPI from the MFM demodulator 34C, and confirms whether the exit gate information has been recorded correctly.

The MFM system is applicable to any of the above-described embodiments, so as to increase the recording capacity of respective embodiments.

Incidentally, in any of the sixth, the seventh and the eighth embodiments, recording of the exit gate information may be made by overwriting using one of three areas in the same manner as before, or by overwriting over the whole of one track. Further, the same is applicable to recording not only at an exit gate, but also to an entrance gate.

According to the magnetic record conversion method of the present invention, it is possible to increase the recording capacity of the ticket even when an existing terminal equipment and a new type terminal equipment coexist.

A digital recording/reproducing circuit of the present invention will be described in detail hereinafter with reference to embodiments shown in FIG. 10 to FIG. 15. A digital magnetic recording/reproducing circuit according to the present embodiment is capable of recording with any of three magnetic recording densities, 100 BPI, 200 BPI and 400 BPI, in accordance with a command when it is assumed that the maximum number of magnetization inversion is at 400 FRPI, and encodes with the FM system for 100 BPI, with both the FM system and the MFM system for 200 BPI and with the MFM system for 400 BPI. Further, reading may be made irrespective of the magnetic recording density is, at any of 100 BPI, 200 BPI and 400 BPI, and no matter which system used either the FM system or the MFM system.

Figure 10:
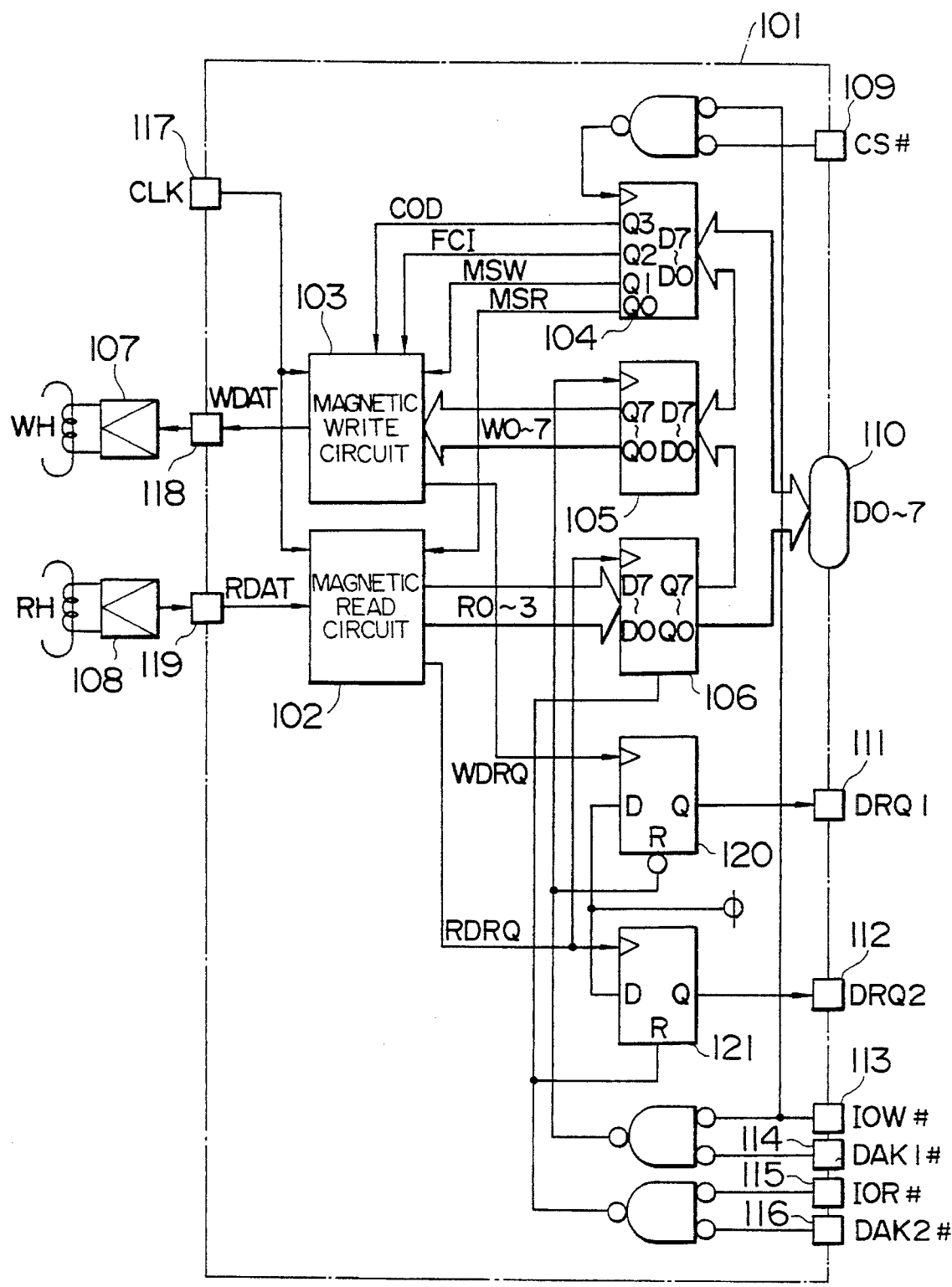
FIG. 10 is a general diagram showing an embodiment of a digital recording/regenerating circuit of the present invention.

FIG. 10 is a circuit diagram showing general construction of a digital recording/reproducing circuit 101 for a magnetic card according to a ninth embodiment of the present invention. This circuit 101 is constructed so that it is connected with a bus of a microcomputer (CPU) system, and performs read/write of a magnetic card in accordance with a command from the CPU and data transfer with a memory of the CPU system by direct memory access (DMA) by means of combination with a universal DMA controller, so that standardization with ASIC and the like may be intended. Here, the CPU system, the DMA controller and the magnetic card are not shown.

In FIG. 10, a numeral 102 denotes a magnetic read circuit, 103 denotes a magnetic write circuit, 104 denotes a command register, 105 denotes a data input latch, 106 denotes a data output latch, 107 denotes an amplifier for magnetic recording, 108 denotes an amplifier for magnetic regeneration, and 109 to 119 denote input/output terminals of respective interface signals.

Among interface signals, CS# indicates a chip selecting signal, IOW# indicates a write signal, IOR# indicates a read signal, and D0 to D7 indicate bus signals, and a command from the CPU is written in a command register 104. Further, among the bits of the command register 104, a magnetic data read command MSR is allocated to Q0, a magnetic data write command MSW is allocated to Q1, a command FCI which changes over the number of magnetization inversion when writing to 1:2 is allocated to Q2, and a command COD for changing over the encoding system when writing to the FM system or the MFM system is allocated to Q3, respectively.

In the present embodiment, when the maximum number of magnetization inversion is set at 400 FRPI, the recordable magnetic recording density is made to become 100 BPI, 200 BPI and 400 BPI by the combination of respective change-over commands FCI and COD as shown in Table 1.

TABLE 1

| Combination when the | COD | |
|---|---|---|
| max. FRPI is 400 | "0" FM system | "1" MFM system |
| FCI | | |
| "0" 200 FRPI | 100 BPI | 200 BPI |
| "1" 400 FRPI | 200 BPI | 400 BPI |

Further, in the present embodiment, the minimum bit period Tb min of an MFM code becomes Tb min=25.4/(400×600)=105.8 μs when the transport speed of the magnetic card is set at 600 mm/s. Thus, a clock having a period of 3.3 μs which is obtainable by dividing 105.8 μs by 32 is supplied externally as a fundamental clock CLK in FIG. 10, and all the timings are generated based on this fundamental clock CLK.

In FIG. 10, DRQ1 and DRQ2 are demand signals to a DMA controller and are output through output latches 120 and 121. Further, DAK#1 and DAK#2 are response signals from the DMA controller. These are used for data transfer between the present circuit 101 and a memory. W0-7 indicates data to a write circuit 103, WDAT indicates data to an amplifier 107 for recording obtained by encoding W0-7, RDAT indicates data from an amplifier 108 for reproducing, and R0-3 indicates data obtained by decoding RDAT in a read circuit 102.

Figure 11:
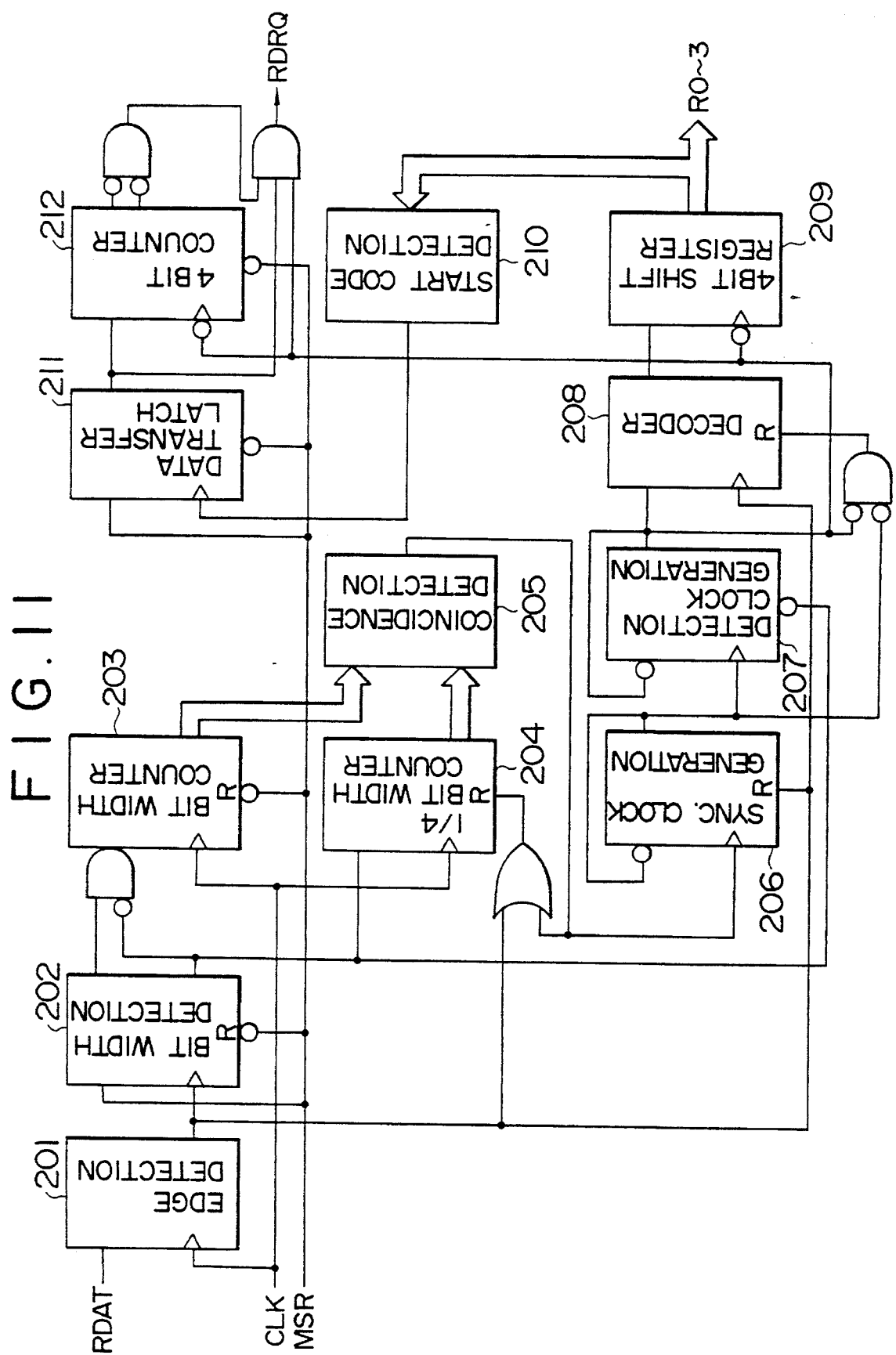
FIG. 11 shows a read circuit.
Figure 12:
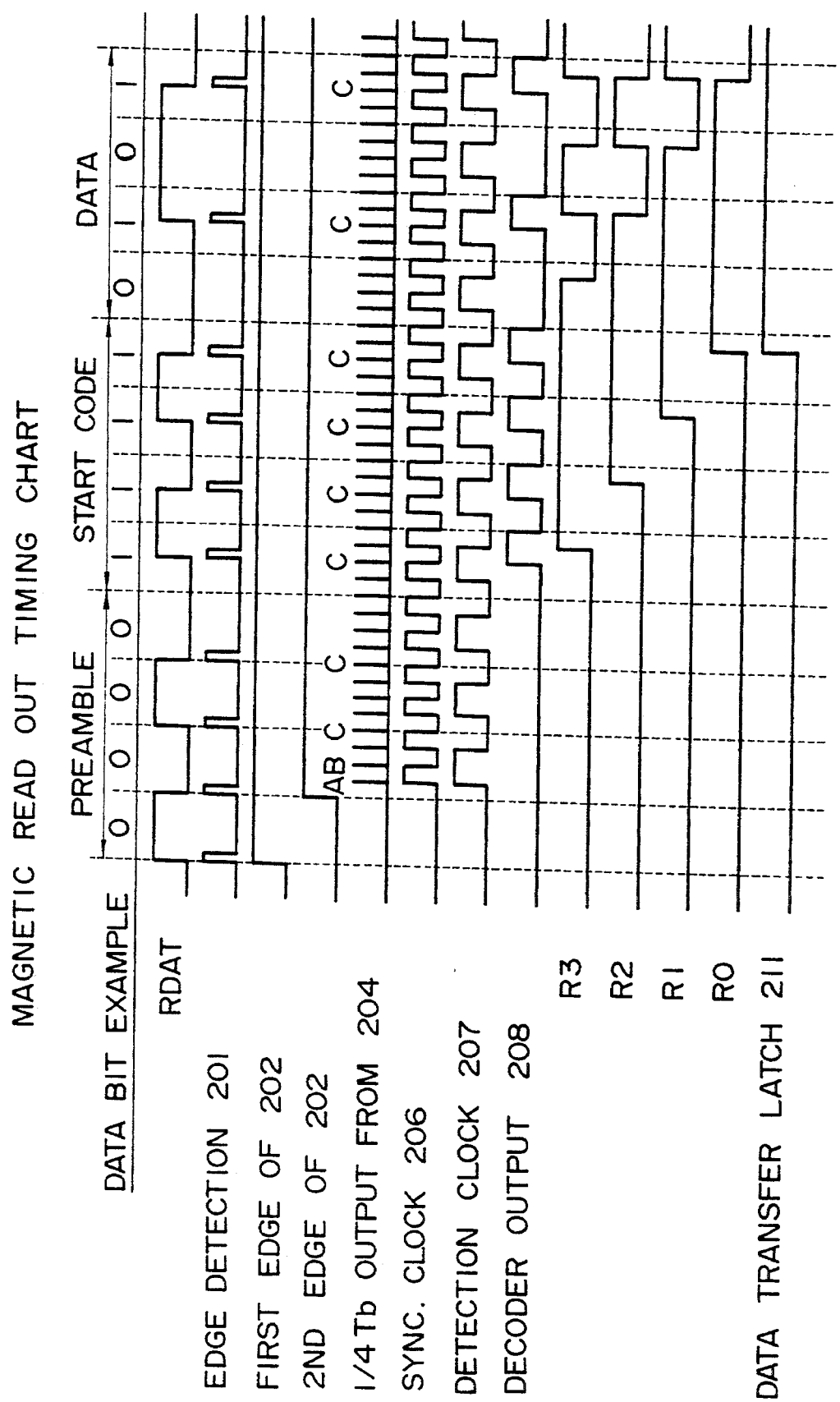
FIG. 12 and FIG. 13 show examples of read timing charts.
Figure 13:
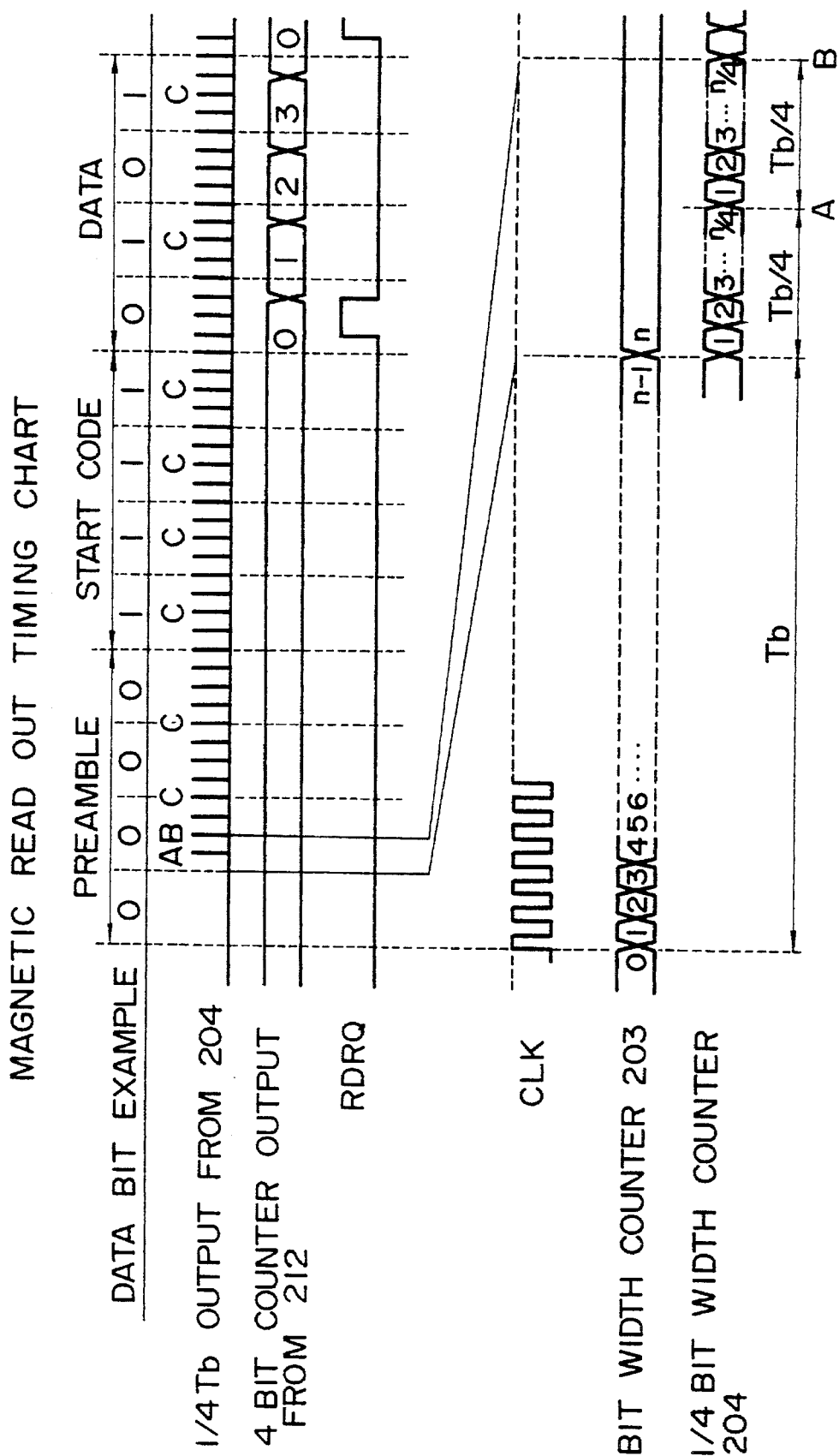

Next, a concrete example of digital reproduction will be described with reference to FIG. 11 thru FIG. 13. FIG. 11 shows a circuit diagram, in which circuits 201 to 212 form the digital reproduction circuit 102. FIG. 12 and FIG. 13 show timing charts thereof. Here, the same number shows a corresponding circuit and the timing thereof among FIG. 11, FIG. 12 and FIG. 13.

In FIG. 11, the circuit 201 detects magnetization inversion of the reproduced data RDAT using the fundamental clock CLK, and outputs edge detection pulse. The circuit 202 denotes the widths of the first edge and the second edge, and enables the bit width counter 203. The bit width counter 203 counts the interval Tb between the first edge and the second edge with respect to the fundamental clock CLK. In the present embodiment, 100 FRPI is reached at a card transport speed of 600 mm/s, and the maximum bit period at 423.2 μs is produced in case of FM recording. Therefore, a count capacity of 128 or more is required when the above is counted with the fundamental clock CLK having a period of 3.3 μs, and an 8-bit binary counter is used.

The circuit 204 is a counter for counting ¼ of the count value Tb of the bit width counter 203 on or after detection of the second edge in the circuit 202, on or after bit synchronization, and a 6-bit binary counter is used. This ¼ bit width counter 204 is reset every time the edge is detected and when 6 bits excluding the last two bits of the bit width counter 203 and 6 bits output from the ¼ bit width counter 204 are compared and found to coincide with each other (every count of ¼ bit width) in the coincidence detection circuit 205.

The circuit 206 generates a synchronizing clock which inverts the output thereof every time the edge is detected and every time the coincidence detection circuit 205 detects coincidence. In other words, the synchronizing clock is reset at every magnetization inversion to become a low level and inverts at every Tb/4 count.

The circuit 207 generates a detection clock which divides the frequency of the synchronizing clock generated in the synchronizing clock generating circuit 206 into half and which plays a role of a detection window when decoding. That is, the detection clock reaches a high level during ±¼ Tb with respect to respective bit cell centers, which is the detection window width.

The circuit 208 is a decoder for encoding the reproduced data RDAT by sampling the detection clock every time the edge is detected. Namely, when the detection clock is at a high level when the edge is detected, the data bit is set to "1".

The circuit 209 is a 4-bit shift register which shifts the output of the decoder 208 as input data every time the detection clock from the detection clock generating circuit 207 falls, and outputs decoded data R0-3.

The circuit 210 detects, when the output of the 4-bit shift register 209 becomes all "1", that is, continuous 4-bit data "1" a start code for digit synchronization, and sets the data transfer latch 211 so as to enable a 4-bit counter 212.

The 4-bit counter 212 counts 0, 1, 2, 3, 0, 1, . . . repeatedly every time the detection clock rises thereafter, and generates a DMA demand signal RDRQ having a detection clock width when this output is zero, at every 4 bits when digit synchronization is obtained, and latches outputs R0-3 of the 4-bit shift register 209 to a data output latch 106 shown in FIG. 10, and transfers them to the memory with DMA. Transfer to the memory is made in the unit of byte (8 bits), but the last four bits are valid digits.

Among the outputs of the ¼ bit width counter 204 in the timing charts shown in FIG. 12 and FIG. 13, portions C are not generated because the ¼ bit width counter 204 is reset when the edge is detected ahead.

Figure 14:
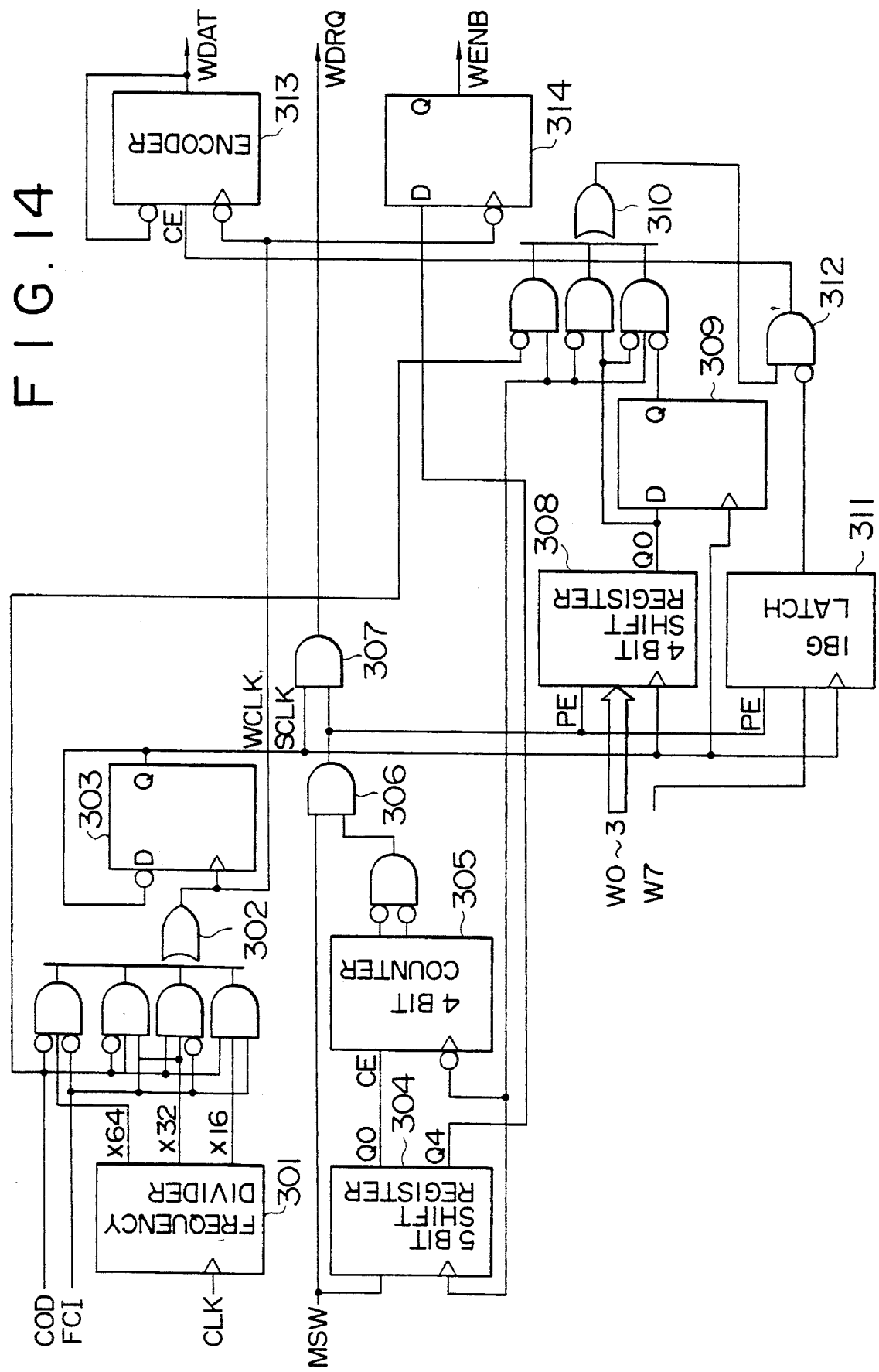
FIG. 14 shows a write circuit.
Figure 15:
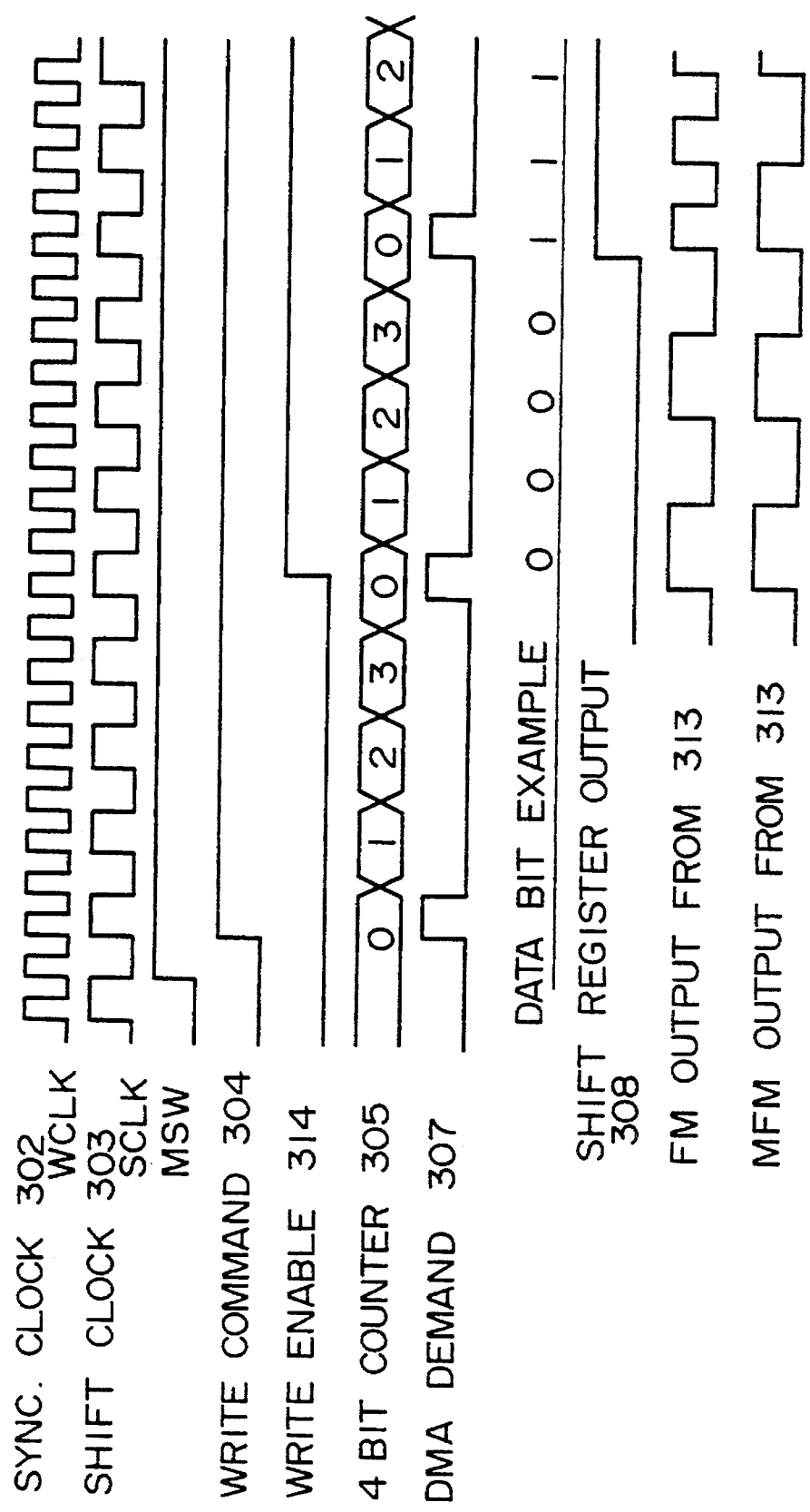
FIG. 15 is a timing chart of the write circuit.
Figure 16:
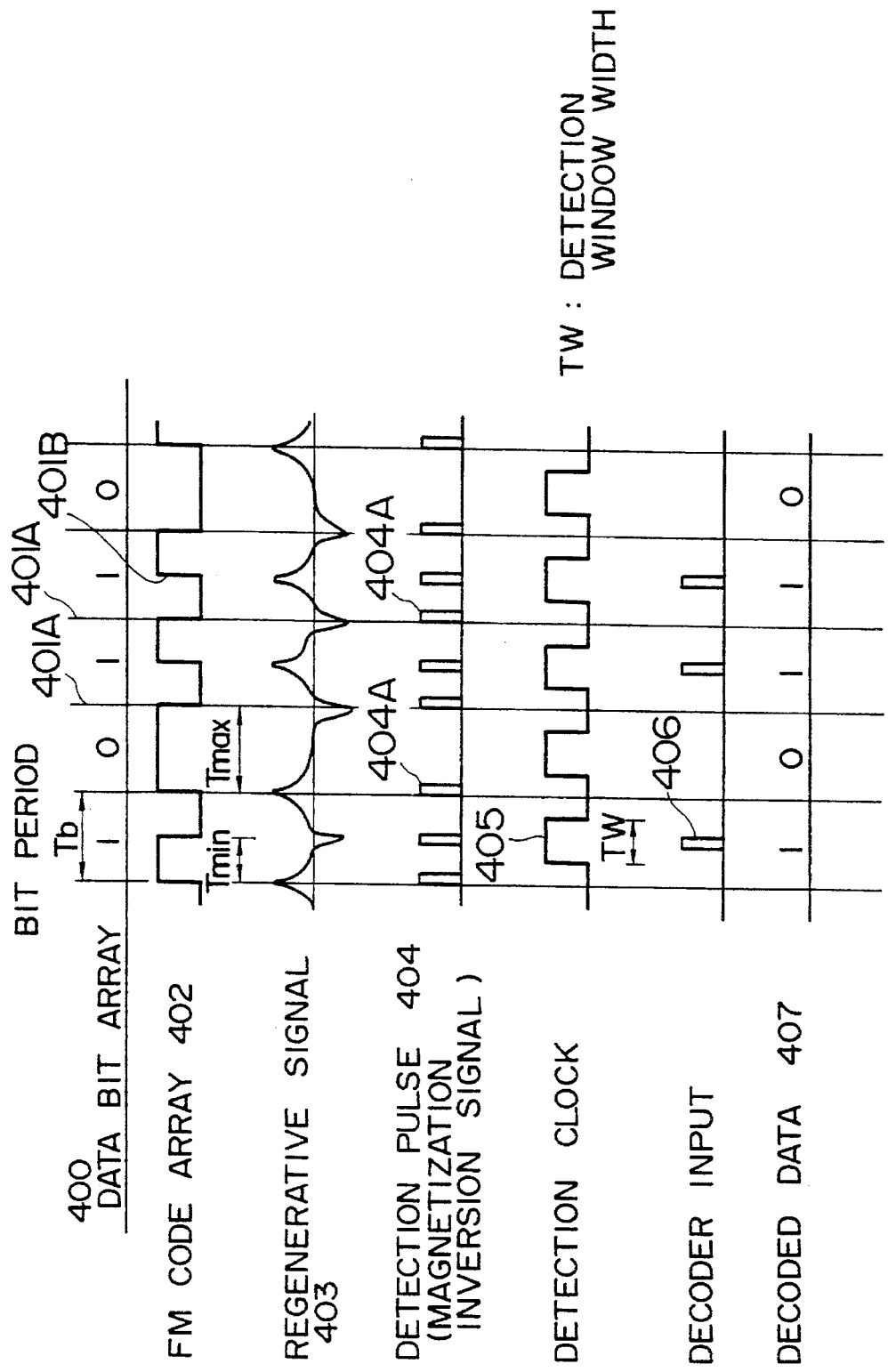
FIG. 16 is a timing chart showing a recording example by the FM system.
Figure 17:
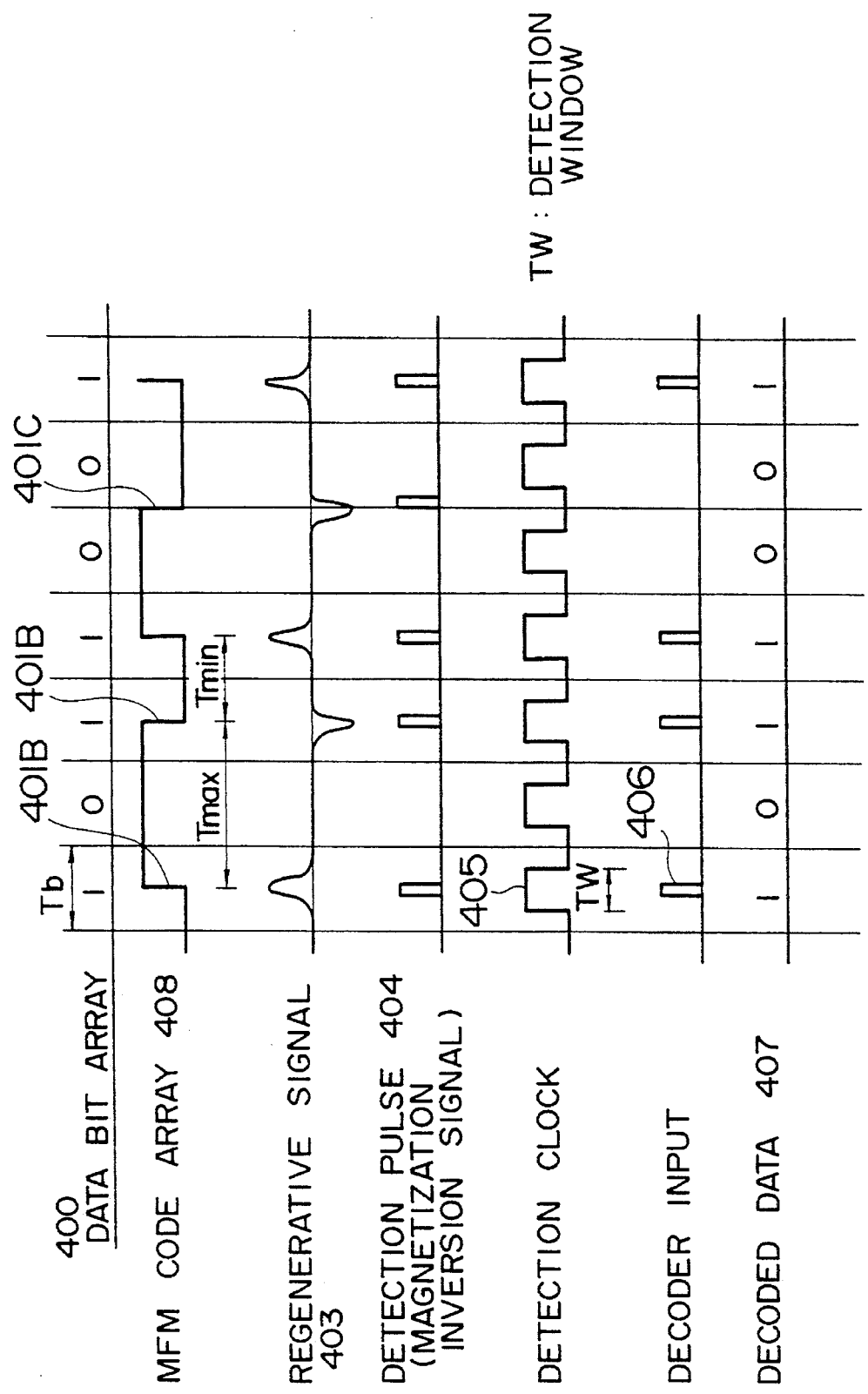
FIG. 17 is a timing chart showing a recording example by the MFM system.

Next, a concrete example of digital recording using the magnetic write circuit 103 will be described with reference to FIG. 14 and FIG. 15. FIG. 14 shows a circuit diagram, in which circuits 301 to 314 form a digital recording circuit 103. FIG. 15 shows a timing chart. Here, the like reference numerals refer to a corresponding circuit and the timing thereof in FIG. 14 and FIG. 15.

In FIG. 14, the circuit 301 is a frequency divider circuit which divides the fundamental clock CLK having a period of 3.3 μs into 16 times, 32 times and 64 times, respectively, and by combination of commands 200 FRPI (FCI= "0") or 400 FRPI (FCI= "1") for magnetization inversion at the card transport speed of 600 mm/s and commands FM (COD="0") or MFM (COD= "1") of record encoding system, generates clocks having periods of 52.8 μs, 105.6 μs and 211.2 μs corresponding to ½ of respective bit periods of magnetic recording densities 400 BPI, 200 BPI and 100 BPI determined by the combination.

The circuit 302 is a gate which selects a clock having a corresponding period from the frequency divider circuit 301 by the combination of respective commands FCI and COD, and outputs it as the synchronizing clock WCLK.

The circuit 303 is a D type latch which divides the synchronizing clock WCLK from the gate circuit 302 into two times so as to generate a shift clock SCLK.

The circuit 304 is a 5-bit shift register which causes a magnetic write command MSW set by the CPU to synchronize with the shift clock SCLK from the latch 303 so as to enable the 4-bit counter 305, and generates a write data enable signal WENB in synchronization with the fall of the synchronizing clock in the D type latch 314 and with the output timing of the encoder 313.

The 4-bit counter 305 counts 0, 1, 2, 3, 0, 1, . . . repeatedly, and generates a DMA demand signal WDRQ having the width of the shift clock SCLK through gates 306 and 307 when this output of the 4-bit counter 305 is zero, at every four bits, and takes the outputs W0-7 of the data input latch 105 shown in FIG. 10 into the 4-bit shift register 308 and the IBG latch 311 shown in FIG. 14.

The 4-bit shift register 308 shifts out 4-bit data W0-3 from the LSB of the outputs W0-7 of the data input latch 105 synchronously with the shift clock SCLK.

The circuit 309 is a D type latch for further delaying the shift outputs W0-3 of the 4-bit shift register 308, and aims at bit cell boundary detection for magnetization inversion at the bit cell boundary where data bits "0" are continuous.

The circuit 310 is a gate which carries out the change of the encoding systems with the command COD by controlling a clock enable signal CE of the encoder 313.

The encoder 313 inverts the output at the fall of the synchronizing clock when the clock is enabled, encodes by way of the FM system or the MFM system in accordance with the output of the gate circuit 310, and outputs encoded data WDAT. The data from the memory are transferred in byte units, and the last four bits W0-3 are valid digits. When the most significant bit W7 is "1", as latched by the IGB latch 311, the bit W7 is used for 4 bit period by the gate 312 in order to prohibit clock enable of the encoder 313 so as not to perform output inversion, that is, to record by d.c. magnetization among data blocks.

In the timing chart shown in FIG. 15, data W0-7 received against the DMA demand (WDRQ) outputted from the gate 307 are incorporated into the shift register 308 at the next DMA demand timing, that is, after delaying by four bit period.

Further, in FIG. 15, data (FM output) in the FM system and data (MFM output) in the MFM system which are output from the encoder 306 show a case in which magnetic recording densities are the same.

According to a digital recording/reproducing circuit of the present invention, it is possible to record data at a magnetic recording density twice as high as a conventional FM system due to the fact that the MFM system is adopted for the record encoding system for a magnetic card. Therefore, it is possible to doubles the information recording capacity of the magnetic card.

In this case, as to the bit synchronism which poses a problem in the MFM system, it has been made possible to reobtain synchronization at the time of respective magnetization inversion detection at bit cell boundaries where data bits "0" are continuous and at bit cell centers of data bits "1", thus having increased synchronism.

Further, MFM or FM may be selected as the encoding system by a command, and the synchronizing clock in encoding may also be changed over. Accordingly, even in case the magnetic recording capacity is planned to be increased in a magnetic card system which is already in operation, the circuit of the present invention may be put in use with already installed equipments during replacement period of the equipments. For example, it is possible that the already installed equipment reads a magnetic card recorded in 100 BPI and with the FM system, and the magnetic card is recorded again in 400 BPI and with the MFM system by the circuit of the present invention and vice versa.

Furthermore, according to the present invention, when the head of the data of the magnetic card includes data bits "0" continuous over four bits and more inverting at bit cell boundaries, it is possible to read the magnetic card irrespective of either the FM system or the MFM system or even if the magnetic recording densities are different (for example, 100 BPI to 400 BPI). Thus, the circuit of the present invention can be standardized, thus making it possible to expect large cost reductions by expanding the application range by forming ASIC or the like.

In the next place, a whole terminal equipment applicable with the present invention such as a transport mechanism will be described with reference to FIG. 18 to FIG. 23.

Figure 22:
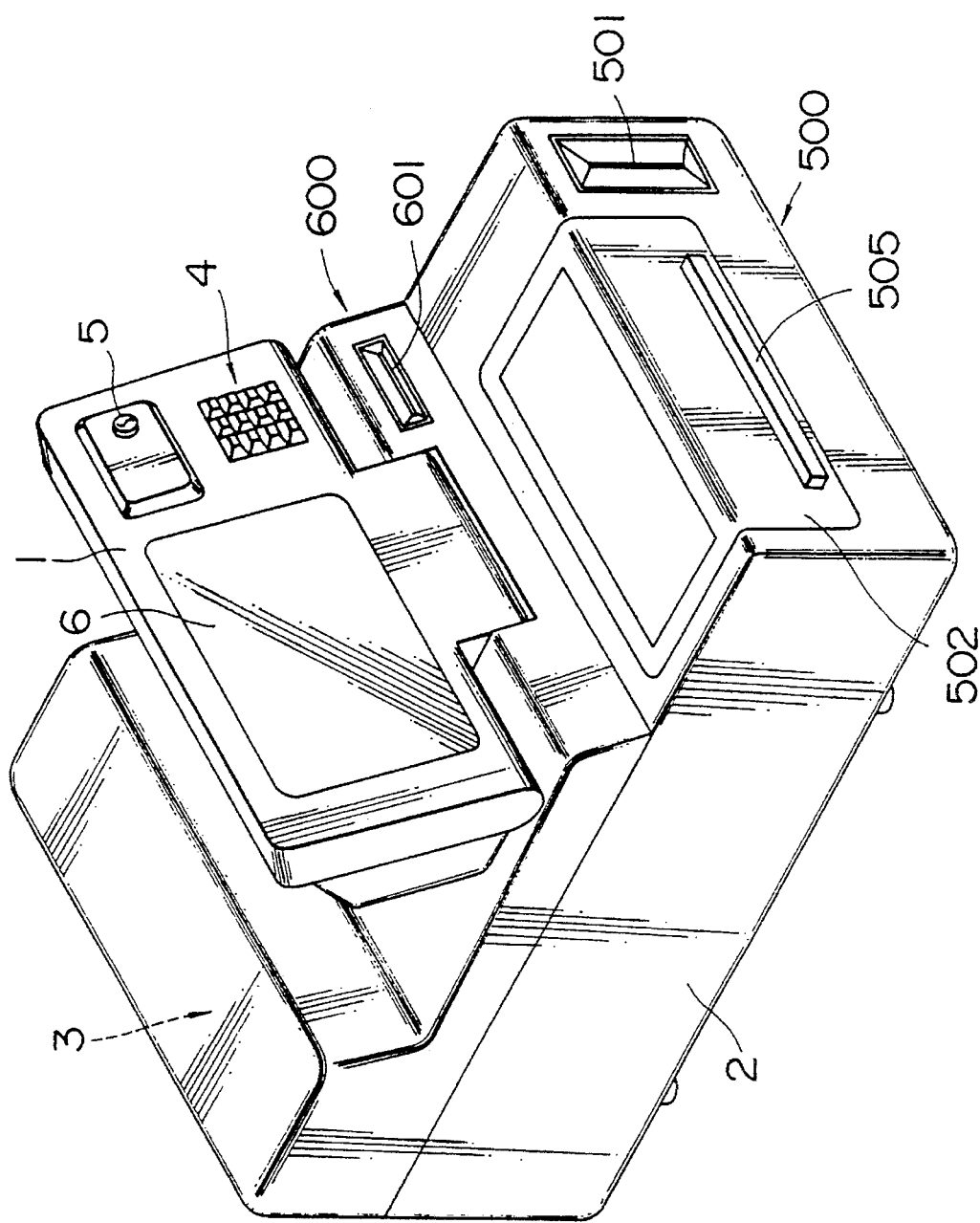

As shown in FIG. 22, a terminal equipment of a toll receiving system of a toll road includes a ticket processing portion 500 with a gateway 501 of a ticket opened thereon, a card processing portion 600 with a gateway 601 for cards other than the ticket opened thereon, and processing control portion 3 of these portions are incorporated in a main body 2 on which a folding type operation display portion 1 is pivoted rotatably.

On the operation display portion 1, a pad 4 and a key 5 for putting the power ON are provided, and a display panel 6 for special processing which is able to be input by touching is further provided. The operation by means of processing buttons is performed in an interactive manner so that necessary processing may be performed naturally. Further, a keyboard not shown having five operation buttons for inputting a car type and the like is mounted on a top surface of a hopper stacker 502 of the ticket processing portion 500 which will be described later.

Figure 18:
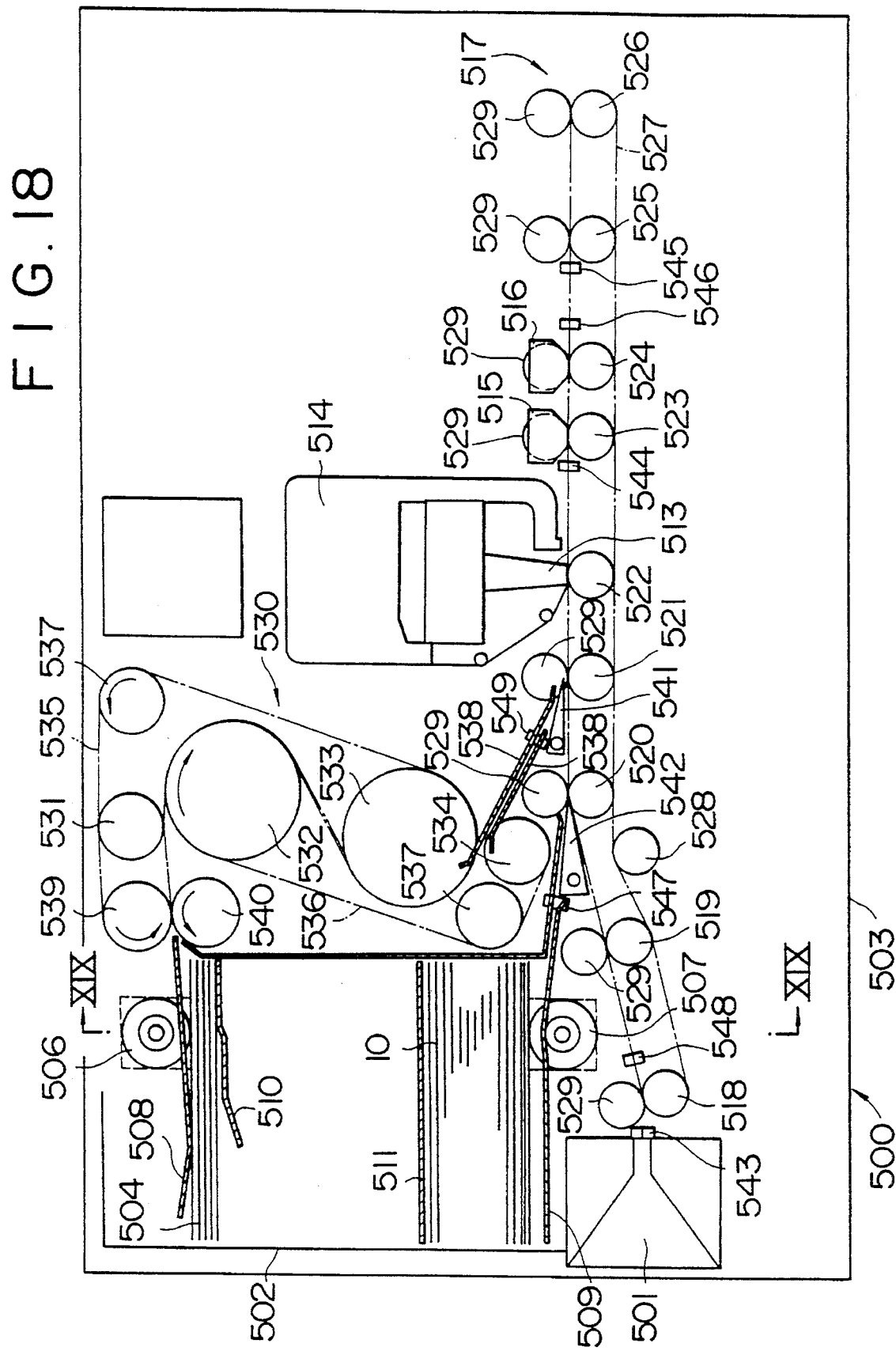
Figure 19:
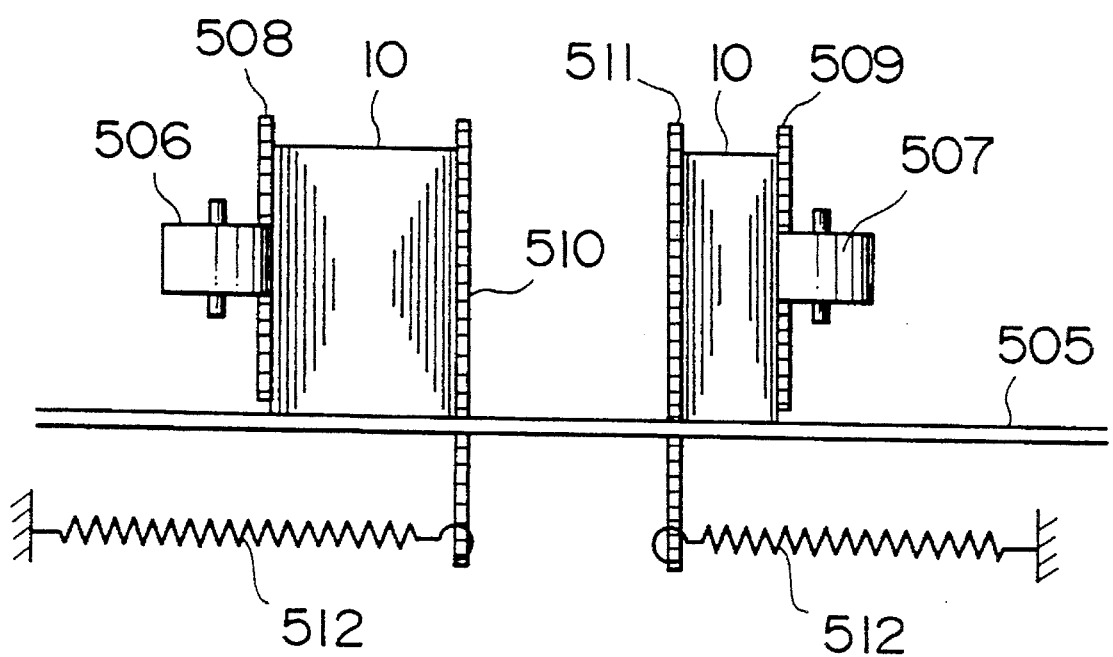

FIG. 18 shows a schematic planar structure of the ticket processing portion 500. Further, FIG. 19 shows a sectional configuration thereof taken along an arrow mark XIX—XIX. The ticket processing portion 500 processes tickets collectively, and may be used as both a ticket vending machine and a ticket identifying machine similar to a conventional unit. Here, it will be described as a ticket identifying machine at an exit gate.

On the side of the gateway 501 formed at a front end of a cabinet 503, new tickets 10 are stored for reissuance in case a road user looses the ticket, and a hopper stacker 502 (having a handle 505) for withdrawing defective tickets 10 among these new tickets 10, used tickets 10 and the like is fitted detachably to the main body 2 and the cabinet 503. On both sides of the hopper stacker 502 are provided a delivery roller 506 for delivering new tickets 10 from the hopper stacker 502, and a lead-in roller 507 for leading off-specification tickets 10 among new tickets 10 and used tickets 10 into the hopper stacker 502. They are fitted rotatably to the cabinet 503, respectively. A pair of guide plates 508 and 509 crossing these delivery roller 506 and lead-in roller 507, respectively, are fixed to the hopper stacker 502. Further, a pair of presser plates 510 and 511 fitted to the hopper stacker 502 are disposed slidably in opposing directions between these guide plates 508 and 509, and respective presser plates 510 and 511 are energized in opposing directions to respective guide plates 508 and 509 through extension springs 512.

Thus, a new ticket 10 inserted between the guide plate 508 and the presser plate 510 is conveyed toward the delivery roller 506 side by the extension spring 512 through the presser plate 510, and a used ticket 10 fed between the guide plate 509 and the presser plate 511 is conveyed toward the lead-in roller 507 side by the extension spring 512 through the presser plate 511.

In the rear of above-described gateway 501 (right side in FIG. 18), there are provided a printer 514 provided with a print head 513 which prints characters, marks and the like onto the ticket 10, a read head 515 for reading magnetic information in a magnetic recording portion not shown formed in the ticket 10 and a recording head 516 for writing new magnetic information in the ticket 10. These head portions have one of the constructions of the above-described embodiments. Further, a standby portion 517 which holds the ticket 10 in a "stand by" status temporarily is formed on the most rear end side of the ticket processing portion 500.

The present embodiment has been described as a ticket identifying machine, but the printing position on the ticket 10 by the print head 513 is different in case of the use as a ticket vending machine. Therefore, the print head 513 is constructed so that it is movable in the width direction of the ticket 10 or printing of a plurality of lines is possible.

The transport line of the ticket 10 is formed within the ticket processing portion 500 so as to connect the standby portion 517 with the gateway 501 through the print head 513, the reproducing head 515 and the recording head 516.

A plurality of driving rollers 518 to 525 which reciprocate the ticket 10 along the transport line are fitted rotatably to the cabinet 503 at an interval shorter than the length of the ticket 10. Through actuation of a pulse motor capable of reciprocatable rotation not shown, one piece of timing belt 527 is wound over these driving rollers 518 to 526 which rotates in a reciprocating manner, and slackness of the timing belt 527 is removed by a tension roller 528 interposed between the driving rollers 519 and 520. Further, pinch rollers 529 fitted rotatably with respect to the cabinet 503 across the transport line abut against driving rollers 518 to 521 and 523 to 526 except the driving roller 522 which is located opposedly to the print head 513.

A ticket feeding unit 530 which feeds new tickets 10 which are pulled out of a hopper stacker 502 by means of above-described delivery roller 506 to the transport line side between the gateway 501 and the print head 513 is provided in the rear of the hopper stacker 502.

The principal part of the ticket feeding unit 530 is composed of a pair of gripping rollers 531 and 532 located on the delivery roller 506 side, a pair of feed-out rollers 533 and 534 located on the transport line side, a pair of feeding belts 535 and 536 which are wound over these gripping rollers 531 and 532 and feed-out rollers 533 and 534, a pair of tension rollers 537 which are arranged between the gripping rollers 531 and 532 and the feed-out rollers 533 and 534 and remove slackness of these feeding belts 535 and 536, and a pair of new ticket guide plates 538 provided between the feed-out rollers 533 and 534 and the driving roller 521 and the pinch roller 529 abutting thereagainst. Further, the gripping roller 531, the feed-out roller 533 and the tension roller 537 on one side are driven to rotate counterclockwise by actuation of a driving source not shown, and the gripping roller 532, the feed-out roller 534 and the tension roller 537 are driven to rotate clockwise in FIG. 18 synchronously with the above-described rotation.

Further, between the delivery roller 506 and the gripping roller 532, there are provided two rollers. One is a feed-in roller 539 which is driven to rotate in the same direction as the gripping roller 531 and feeds a new ticket 10 pulled out of the hopper stacker 502 to the gripping rollers 531 and 532 side, and another is a separating roller 540 which opposes to the feed-in roller 539 and is driven to rotate in a reverse direction to the feed-in roller 539, and checks passage of two sheets and more of tickets 10 when plural sheets of tickets 10 are fed in.

Thus, a new ticket 10 which is pushed against the delivery roller 506 by means of the extention spring 512 is sent out inbetween the feed-in roller 539 and the separating roller 540 by the rotation of the delivery roller 506. Then, only one sheet of ticket 10 is sent out into a gap between the feeding belts 535 and 536 between the gripping rollers 531 and 532 by the action of the separating roller 540 which rotates in the reverse direction. Thus, the ticket 10 is sent out on the transport line between the driving roller 521 and the pinch roller 529 abutting thereagainst from the feed-out rollers 533 and 534 through the new ticket guide plates 538 in a state that it is put between these feeding belts 535 and 536.

Besides, a one-way flapper 541 which regulates the moving direction of the ticket 10 is pivoted in an oscillating manner with respect to the cabinet 503 between these new ticket guide plate 538, the driving roller 521 and the pinch roller 529 abutting thereagainst. When the ticket 10 is transported from the standby portion 517 side to the gateway 501 side or the hopper stacker 502 side, the one-way flapper 541 is energized upward in FIG. 18 at the point end side thereof through a spring member not shown so that the ticket 10 is not fed from the new ticket guide plate 538 to the ticket feeding unit 530 side.

On the other hand, a change-over flapper 542 which changes over the transport direction of the ticket 10 depending on a case that the ticket 10 is transported from the print head 513 side to the gateway 501 side and a case that the ticket 10 travelling in the hopper stacker 502 is withdrawn is pivoted in an oscillating manner to the cabinet 503 halfway on the transport line between the driving rollers 519 and 520, and this change-over flapper 542 is made to oscillate by flapper driving means such as a rotary solenoid not shown.

The operation timing of above-described delivery roller 506 and lead-in roller 507, printer 514, driving rollers 518 to 526, ticket feeding unit 530, flapper driving means and the like is controlled by the processing control portion 3 incorporated in the rear of the main body 2. For such a purpose, optical sensors 543 to 549 which detect passage of the ticket 10 are arranged halfway on the transport line, between the feed-out rollers 533 and 534 of the ticket feeding unit 530 and the one-way flapper 541, between the hopper stacker 502 and the change-over flapper 542, respectively, so as to output a detection signal to the processing control portion 3.

Figure 20:
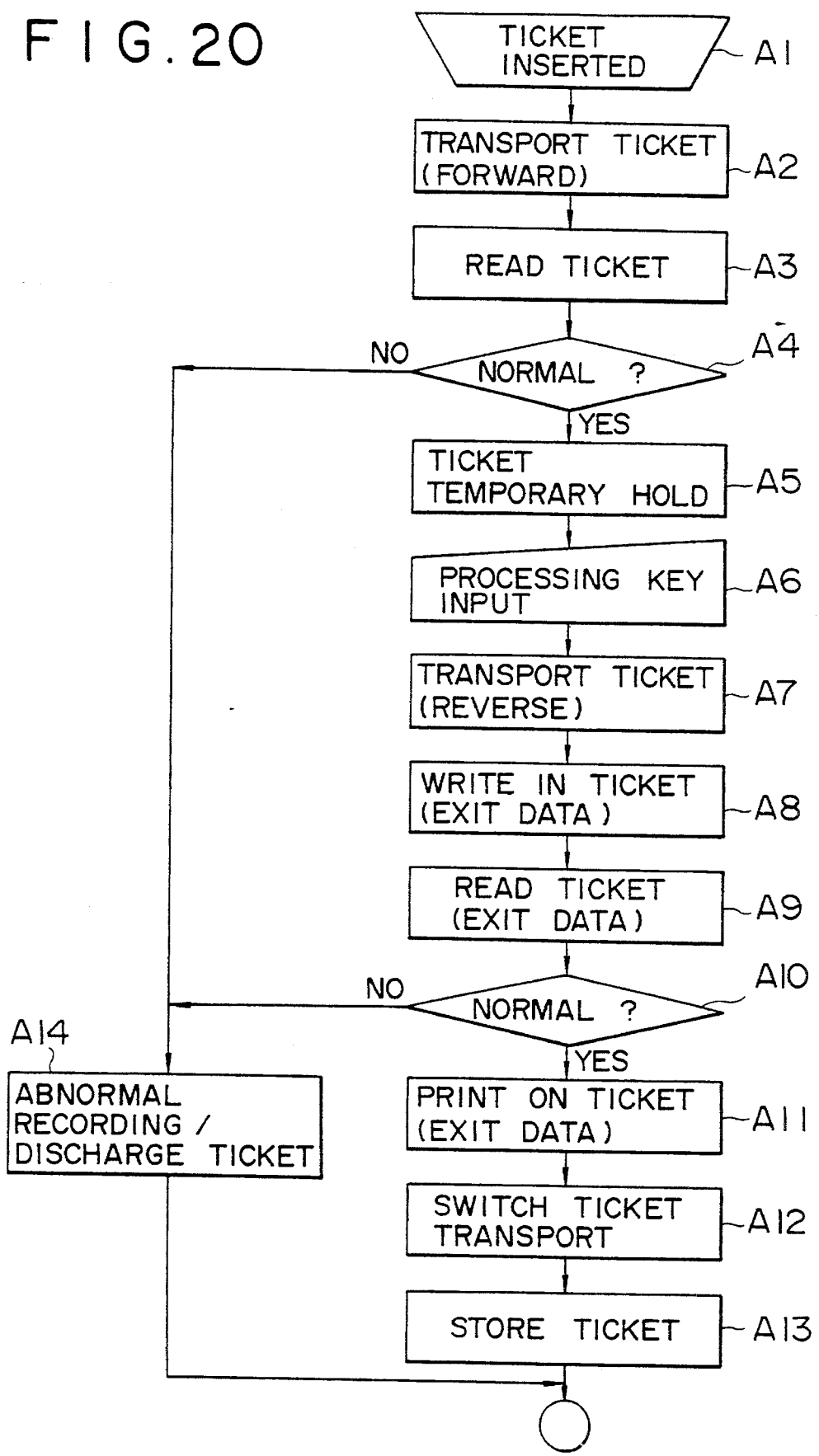

FIG. 20 shows a flow of processing with the ticket processing portion 500. An operator receives the ticket 10 from a road user who is a customer at a check barrier, an exit gate and the like. When the ticket 10 is inserted into the gateway 501 in a step A1, the optical sensor 543 detects it, and the pulse motor rotates forwardly in a step A2. As a result, the ticket 10 starts to move toward the standby portion 517 side along the transport line. When the optical sensor 544 detects passage of the ticket 10, the read head 511 reads information recorded in the ticket 10 in a step A3, and it is judged whether the recorded information of the ticket 10 is normal or not in a step A4.

In case the recorded information of the ticket 10 is judged to be normal in the step A4, the ticket 10 is continued to be transported as it is. The pulse motor is stopped to be driven in a certain period of time after the optical sensor 545 detects passage of the ticket 10, and the ticket 10 is made to stand by temporarily at the standby portion 517 in a step A5.

During the temporary standby period, the collection processing of the toll displayed on the display panel 6 of the operation display portion 1 is carried out by using various processing buttons not shown, the ten-key 4 and the like in a step A6. For example, when the toll is collected with a highway card, a credit card, an IC card or the like instead of toll collection in cash, a toll receiver inserts such a card received from a road user into the gateway 601 of the card processing unit 600 so as to have card data read, confirms with the display panel 6 that there is nothing abnormal, and operates above-described operation buttons.

With this, as shown in step A7, the pulse motor of the ticket processing portion 500 rotates reversely, the ticket 10 is transported from the standby portion 517 toward the recording head 516. The recording head 516 records the toll of utilization, the date and hour of utilization, or information related to an exit date and toll collection means, and data recorded in a card in case of toll collection by a card in the ticket 10 as shown in a step A8 at the time when the ticket 10 is detected by the optical sensor 546. Further, the recorded data are read with the read head 515 in a step A9 so as to judge whether there is something wrong in the recorded information in a step A10.

When it is judged that there is nothing abnormal in the data recorded in the step A10, necessary recorded data are printed at a predetermined location of the ticket 10 by the print head 513 in a step A11. Then, the change-over flapper 542 is swung to the hopper stacker 502 side in a step A12, and the ticket 10 is withdrawn into the hopper stacker 502 in a step A13. At this time, the pulse motor is stopped to be actuated after confirming passage of the ticket 10 with the optical sensor 547.

When it is judged that there is something abnormal in the record in the ticket 10 in the steps A4 or A10, the ticket 10 is not withdrawn into the hopper stacker 502. The change-over flapper 542 is swung to the gateway 501 side in a step A14, thus returning the ticket 10 to the gateway 501. At this time, the pulse motor is deenergized after confirming passage of the ticket 10 with the optical sensor 548.

If there is a mistake in inserting the ticket 10, it is only required to insert the ticket 10 returned through the gateway 501 correctly again through the gateway 501. If there is as abnormal record, however, processing such as issuance of a new ticket 10 is performed by means of processing buttons displayed on the display panel 6. Such an operation is similar to that required in case of damage, loss and the like of the ticket 10. Furthermore, the above-described special processing is also performed in case of invalidity and the like of various cards.

As described above, in the present invention, the standby portion 517 for having the ticket 10 stand by temporarily is provided in the ticket processing portion 500. Accordingly, it is not required to give consideration to the order of processing procedures of the ticket 10 and other cards at all, thus presenting excellent workability.

The ticket processing portion 500 has been described as a ticket identifying machine, but the processing flow in case the ticket processing portion 500 is adopted as a ticket vending machine is shown in FIG. 21. First, a power supply is put ON as initial operation in a step B1, and operation buttons for starting operation which appear on the display panel 6 of the operation display portion 1 are pushed in a step B2. With this, as shown in a step B3, the pulse motor rotates forwardly and the delivery roller 506 and the ticket feeding unit 530 are actuated to extract one sheet of ticket 10 out of the hopper stacker 502, and the ticket 10 is sent out to the reproducing head 515 side. Then, when passage of the ticket 10 is detected by the optical sensors 549 and 544, the read head 515 reads the magnetic information in the ticket 10 in a step B4. It is judged whether the ticket 10 is a new ticket or not or whether the inside and outside thereof are correct or not based on the above in a step B5.

When it is judged that the ticket 10 is correct in the step B5, the ticket is continued to be transported as it is. The pulse motor is deenergized after detecting passage of the ticket 10 with the optical sensor 545, and the ticket 10 is made to stand by temporarily at the standby portion 517 as shown in a step B6. Such a standby state continues until a pushbutton (not shown) for selecting a car type is operated.

Then, when an operator operates the pushbutton for selecting a car type in a step B7, the pulse motor rotates reversely in a step B8, the ticket 10 starts to move from the standby portion 517 to the read head 516 side. Information such as the car type, the date and hour or an entrance gate and the like is written in the ticket 10 by the read head 516 in a step B9 when passage of the ticket 10 is detected with the optical sensor 546. Then, this recorded information is read by the read head 515 in a step B10, and it is judged whether recording has been performed correctly or not in a step B11.

When it is judged that the record on the ticket 10 is normal in a step B11, necessary information is printed on the ticket 10 by means of the print head 513 in a step B12, and the ticket is sent out to the gateway 501 as it is as shown in a step B13. At this time, the pulse motor is deenergized after detecting passage of the ticket 10 with the optical sensor 548.

The ticket 10 which has been sent out to the gateway 501 is handed over to a road user by an operator in a step B14. When it is detected by the optical sensor 543 that the ticket 10 has been extracted through the gateway 501, the pulse motor rotates forwardly again, and the delivery roller 506 and the ticket feeding unit 530 are actuated so as to extract one sheet of ticket 10 out of the hopper stacker 502 and send it to the read head 515 side in a step B15. Then, passage of the ticket 10 is detected by the optical sensors 549 and 544, the read head 515 reads magnetic information of the ticket 10 in a step B16. It is judged based on the magnetic information whether the ticket 10 is a new ticket or not or whether inside and outside thereof are correct or not in a step B17.

When it is judged that the ticket 10 is normal in the step B17, the ticket is continued to be transported as is. The pulse motor is stopped to be actuated after passage of the ticket 10 is detected by the optical sensor 545, and the ticket 10 is made to stand by temporarily at the standby portion 517 as shown in a step B18, then returning to the step B7.

When it is detected that there is something abnormal in the ticket 10 in any of above-described steps B5, B11 and B17, the process is shifted to a step B19 where judgement is made to be abnormal record. The change-over flapper 542 is changed over to the hopper stacker 502 side in a step B20, and the abnormal ticket 10 is withdrawn into the hopper stacker 502 in a step B21. Then, the process returns to the step B3 after the optical sensor 547 detects passage of this abnormal ticket 10.

As described above, it is possible to issue a ticket 10 in a very short period of time after operating a pushbutton for selecting a car type by having a normal ticket 10 stand by temporarily at the standby portion 517 in advance.

Incidentally, the processing mode of the ticket processing portion 500 is any useful for entrance gate, an exit gate, a check barrier and a succeeding ticket issuing gate. The change-over of these processing modes is achieved by a command to the processing control portion 3 from the operation display portion 1.

Figure 23:
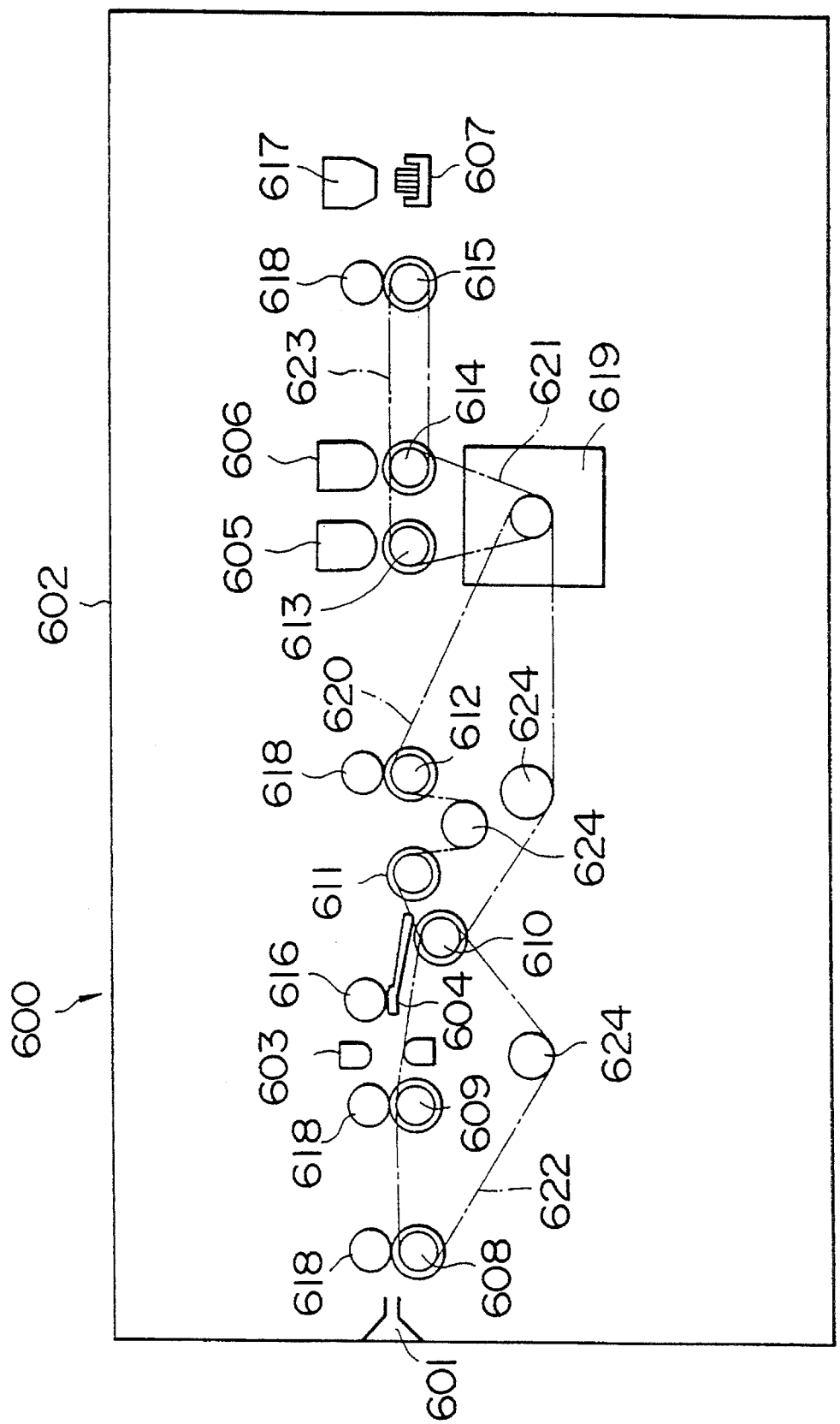

As shown in FIG. 23 which represents a schematic construction of the card processing unit 600, this card processing unit 600 processes various cards such as a "Highway Card" which is a prepaid card other than the ticket 10, a "Separately Paid Plate" which is a credit card, or an IC card collectively.

In this card processing unit 600, a transport line is formed in a straight line from the gateway 610 to the rear end of a cabinet 602. In the cabinet 602, there are provided a card type sensor 603 for detecting a type of the card in consecutive order from the gateway 601 along the transport line, a thermosensible print head 604 for recording necessary information in a printable card such as a "Highway Card", a reproducing head 605 for reading magnetic information of a magnetic recording portion not shown formed in a card such as a credit card, a recording head 606 for writing new magnetic information into this magnetic recording portion, and a read electrode 607 for reading information recorded in a card such as an IC card.

A plurality of driving rollers 608 to 615 which have a card reciprocate along the transport line are fitted to the cabinet 602 rotatably at intervals shorter than the length of a card. A presser roller 616 abuts against the thermosensible print head 607. The driving rollers 613 and 614 oppose the reproducing head 605 and the recording head 606 across the transport line, respectively. On the other hand, a retainer 617 which opposes the read electrode 607 across the transport line is disposed therein. Further, pinch rollers 618 fitted to the cabinet 602 across the transport line, respectively, abut against driving rollers 608 and 609 located between the gateway 601 and the thermosensible print head 604 and driving rollers 612 and 615 located on both sides of the driving rollers 613 and 614 as shown in FIG. 19.

Respective driving rollers 608 to 615 are driven to rotate synchronously through timing belts 620 to 622, respectively, by means of a pulse motor 619 which is installed below the reproducing head 605 and the recording head 606 and is able to rotate reciprocably. The actuation of these pulse motor 619, thermosensible print head 604, reproducing head 605, recording head 606, read electrode 607 and the like is controlled by the processing control portion 3 based on the detection signal from the card type sensor 603.

Reference numeral 624 in the figure indicates a tension roller.

Accordingly, when an operator inserts a card received from a road user into the gateway 601 at the time of toll collection, the pulse motor 619 rotates forwardly so as to pull the card into the cabinet 602. In case the card type sensor 603 detects the card as a "Highway Card", the present balance is read with the reproducing head 605 and output to the processing control portion 3 incorporated in the main body 2. Thereafter, the toll for use at this time is collected, and the balance and the like are written in the "Highway Card" with the recording head 606. Then, the pulse motor 619 rotates reversely so as to send out the "Highway Card" to the gateway 601, and on the way, the above-described processing is confirmed with the reproducing head 605 as occasion demands, and the above-described balance and the like are also printed with the thermosensible print head 604.

When the card type sensor 603 detects that the card is a credit card such as a "Separately Paid Plate", information recorded in this credit card is read with the reproducing head 605 and output to the processing control portion 3. Thereafter, the pulse motor 619 rotates reversely so as to send out this "Highway Card" to the gateway 601. Further, in case of an IC card, the IC card is transported up to the read electrode 607 and information recorded therein is read and output to the processing control portion 3. Thereafter, the pulse motor 619 rotates reversely so as to send out the IC card to the gateway 601.

We claim:

1. A digital recording circuit for a magnetic card comprising an encoding circuit which encodes input data according to a modified frequency modulation technique and outputs, to a recording amplifier, a modified frequency modulation code array having four bits or more of continuous "0" data bits at the beginning of said code array, with magnetization inversion occurring in said continuous "0" data bits only at bit cell boundaries of said continuous "0" data bits; and a synchronous clock generating circuit which accepts as an input a fundamental clock having a fundamental clock period Tb (min) $/2^N$, where Tb (min) is a minimum bit period recorded in a magnetic card and N is a positive integer chosen so as to make the fundamental clock period sufficiently small to distinguish a half period of Tb (min), and which generates a synchronizing clock by dividing a frequency of the fundamental clock by 2 to the N'th power in accordance with an inputted command which is indicative of a magnetization rate where N' is a natural number, wherein said encoding circuit encodes input data using the synchronizing clock pursuant to a modulation technique comprising either frequency modulation or modified frequency modulation as indicated by another inputted command, and outputs to a recording amplifier, in addition to encoded input data, a code array having, at the beginning thereof, at least four continuous "0" data bits with magnetization inversion occurring in said at least four continuous "0" data bits only at bit cell boundaries of said at least four continuous "0" data bits in either case of frequency modulation or modified frequency modulation.

* * * * *